US011635289B2

(12) United States Patent
Sato

(10) Patent No.: US 11,635,289 B2
(45) Date of Patent: Apr. 25, 2023

(54) SURFACE SHAPE MEASUREMENT DEVICE AND SURFACE SHAPE MEASUREMENT METHOD

(71) Applicant: University of Hyogo, Kobe (JP)

(72) Inventor: Kunihiro Sato, Himeji (JP)

(73) Assignee: University of Hyogo, Kobe (JP)

( * ) Notice: Subject to any disclaimer, the term of this patent is extended or adjusted under 35 U.S.C. 154(b) by 236 days.

(21) Appl. No.: 17/272,426

(22) PCT Filed: Aug. 29, 2019

(86) PCT No.: PCT/JP2019/033990
§ 371 (c)(1),
(2) Date: Mar. 1, 2021

(87) PCT Pub. No.: WO2020/045589
PCT Pub. Date: Mar. 5, 2020

(65) Prior Publication Data
US 2022/0349699 A1 Nov. 3, 2022

(30) Foreign Application Priority Data
Aug. 29, 2018 (JP) .............................. JP2018-160900

(51) Int. Cl.
*G01B 9/02015* (2022.01)
*G01B 9/02* (2022.01)
*G03H 1/04* (2006.01)

(52) U.S. Cl.
CPC ..... *G01B 9/02032* (2013.01); *G01B 9/02038* (2013.01); *G01B 9/02047* (2013.01); *G03H 1/0443* (2013.01)

(58) Field of Classification Search
CPC ............ G01B 9/02032; G01B 9/02038; G01B 9/02047; G01B 9/021; G01B 9/023;
(Continued)

(56) References Cited

U.S. PATENT DOCUMENTS 6,525,875 B1 * 2/2003 Lauer .................. G03H 1/0866
359/371
8,269,981 B1 9/2012 Doerband et al.
(Continued)

FOREIGN PATENT DOCUMENTS

JP    H0688715 A  *  3/1994
JP    2016-99122 A     5/2016
(Continued)

OTHER PUBLICATIONS

International Search Report (PCT/ISA/210) issued in PCT Application No. PCT/JP2019/033990 dated Nov. 5, 2019 with English translation (three (3) pages).
(Continued)

*Primary Examiner* — Michael A Lyons
(74) *Attorney, Agent, or Firm* — Crowell & Moring LLP

(57) ABSTRACT

The illumination light condensing point $P_Q$ and the reference light condensing point $P_L$ are arranged as mirror images of each other with respect to the virtual plane VP, and each data of the object light O, being a reflected light of the spherical wave illumination light Q, and the inline spherical wave reference light L is recorded on each hologram. On the virtual plane VP, the reconstructed object light hologram $h^V$ for measurement is generated, and the spherical wave optical hologram $s^V$ representing a spherical wave light emitted from the reference light condensing point $P_L$ is analytically generated. The height distribution of the surface to be measured of the object 4 is obtained from the phase distribution obtained by dividing the reconstructed object light hologram $h^V$ by the spherical wave light hologram $s^V$.

14 Claims, 15 Drawing Sheets

(58) Field of Classification Search
CPC .......... G01B 11/24; G03H 1/0443; G03H 2001/0038; G03H 2001/0445; G03H 2001/045

See application file for complete search history.

(56) References Cited

U.S. PATENT DOCUMENTS

| | | |
|---|---|---|
| 8,416,669 B2 | 4/2013 | Sato |
| 9,036,900 B2 | 5/2015 | Sato |
| 9,581,961 B2 | 2/2017 | Sato |
| 10,156,829 B2 | 12/2018 | Sato |
| 10,209,673 B2 | 2/2019 | Sato |
| 10,635,049 B2 | 4/2020 | Sato |
| 2017/0277123 A1 | 9/2017 | Yasuda |
| 2017/0370780 A1* | 12/2017 | Okamoto ............ G03H 1/0866 |

FOREIGN PATENT DOCUMENTS

| | | |
|---|---|---|
| JP | 2017-181591 A | 10/2017 |
| WO | WO 2011/089820 A1 | 7/2011 |
| WO | WO 2012/005315 A1 | 1/2012 |
| WO | WO 2012/099220 A1 | 7/2012 |
| WO | WO 2014/054776 A1 | 4/2014 |
| WO | WO 2015/064088 A1 | 5/2015 |
| WO | WO 2018/038064 A1 | 3/2018 |

OTHER PUBLICATIONS

Japanese-language Written Opinion (PCT/ISA/237) issued in PCT Application No. PCT/JP2019/033990 dated Nov. 5, 2019 (three (3) pages).

\* cited by examiner

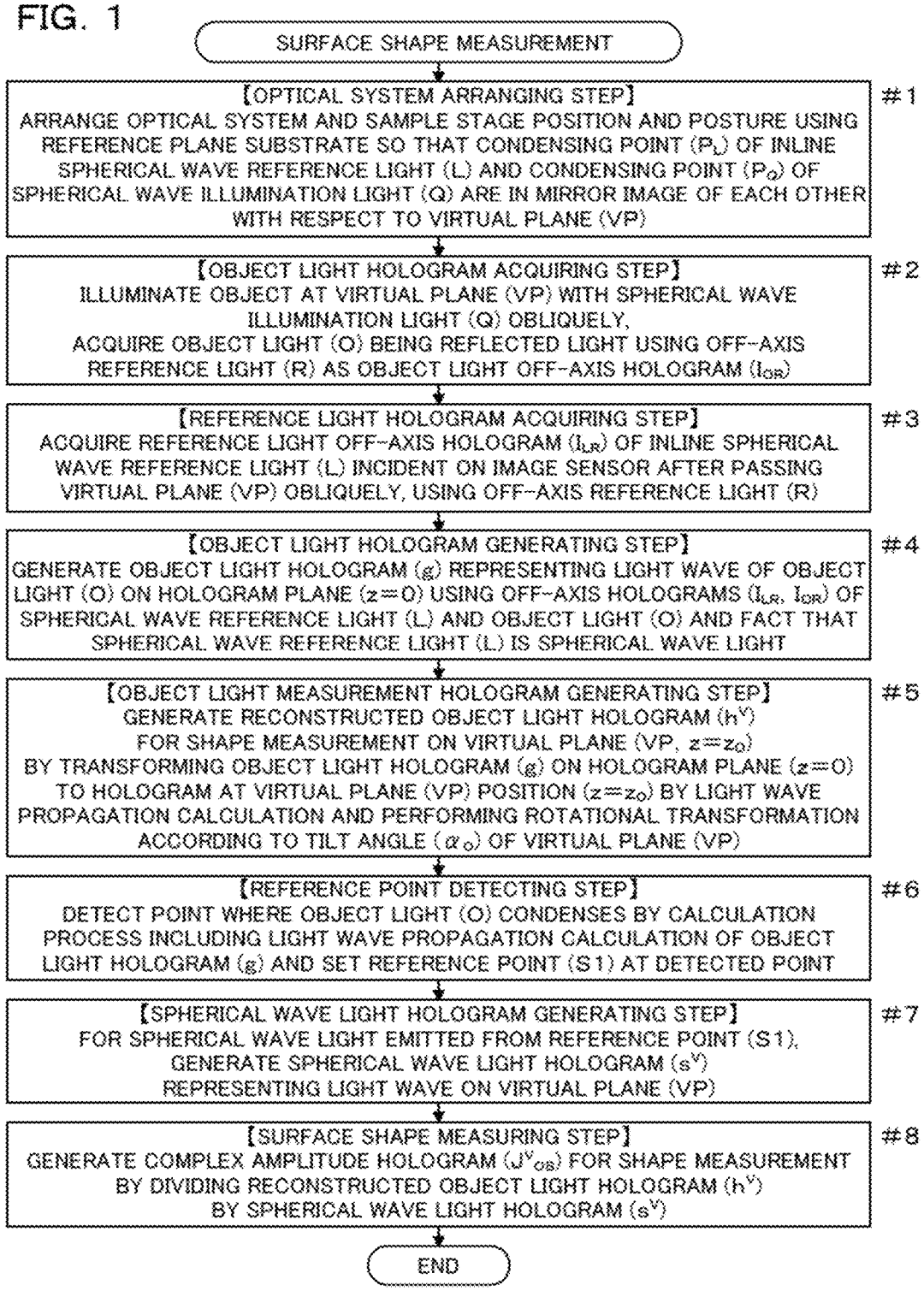

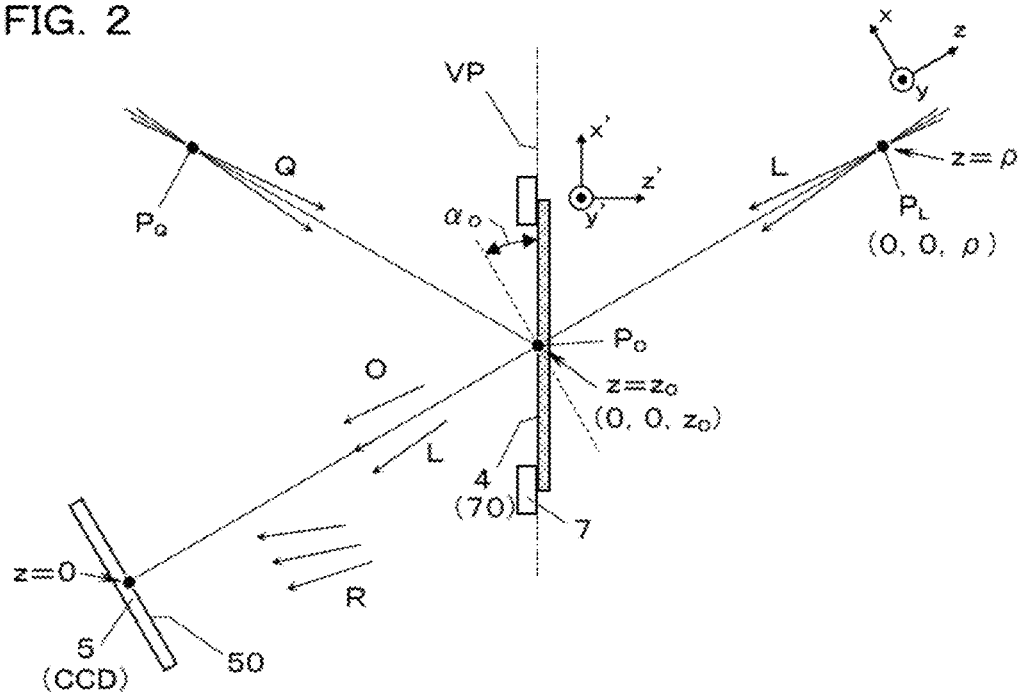

SURFACE SHAPE MEASUREMENT DEVICE AND SURFACE SHAPE MEASUREMENT METHOD

TECHNICAL FIELD

The present invention relates to a surface shape measuring device and a surface shape measuring method in digital holography.

BACKGROUND ART

Conventionally, as a technology for analyzing light waves such as reflected light and transmitted light, there is holography by which data of light intensity and phase are recorded together, on a recording medium such as a photographic plate called a hologram, and analyzed. In recent years, holography has been performed to acquire the intensity and phase of a light wave as digital data using an image sensor and a semiconductor memory or to generate a hologram on a computer for analysis. Such holography is called digital holography.

In the digital holography, various technologies have been proposed for achieving higher speed and higher accuracy in hologram data acquisition and processing, and have been applied to imaging. For example, digital holography is known in which spatial frequency filtering and spatial heterodyne modulation are applied to hologram data recorded by one shot, and a complex amplitude inline hologram for object image reconstruction is generated quickly and accurately (for example, patent document 1).

In order to solve the problem of the conventional optical microscope, a method for accurately acquiring object light of a large numerical aperture by one shot using holography without using any imaging lens and a method for accurately reconstructing high resolution three-dimensional image on a computer are known (for example, patent document 2). According to these method, a lens less three-dimensional microscope is realized, and such a microscope is capable of acquiring and reconstructing an undistorted high-resolution three-dimensional moving image. Since such a microscope does not use any imaging lens, it is possible to solve the problem of the conventional optical microscope, namely, the problem caused by the influence of the medium and the imaging lens.

Moreover, there is known a high resolution tomography, which uses a reflection type lens less holographic microscope and wavelength sweep laser light, for measuring the cell in culture solution or the structure in a living body tissue with high resolution (for example, patent documents 3).

Furthermore, there is known a method for reconstructing an object light with a condition of a synthetic numerical aperture exceeding 1, by synthesizing a plurality of large numerical aperture object light holograms in which object lights of large numerical aperture are recorded as hologram data for each incident angle of illumination light, wherein the object lights are emitted lights from an object illuminated with illumination lights having different incident directions (for example, patent document 4). According to this method, an ultra-high resolution three-dimensional microscope having a resolution exceeding usual diffraction limit can be realized.

In addition, there is known a holographic ellipsometry device that uses accurate recording of light waves by one-shot digital holography and plane wave expansion of recorded light waves (for example, see patent document 5). According to this ellipsometry device, since data of reflected lights of non-parallel illumination lights having a large number of incident angles are collectively recorded in one hologram, the ellipsometry can be performed for each of a large number of wave number vectors corresponding to the incident angle in order to obtain the ellipsometric angles LP and A, and the measurement efficiency can be improved.

Further, an interferometric measuring device for performing shape measurement is known, in which an image pickup device, two imaging lenses, a cube-type beam splitter, an element having a Fizeau reference plane, and an object to be measured are arranged in series, and interference fringes of lights reflected, respectively from the reference plane and the object to be measured, are recorded (for example, see patent document 6).

PRIOR ART DOCUMENTS

Patent Documents

Patent document 1: WO2011/089820
Patent document 2: WO2012/005315
Patent document 3: WO2014/054776
Patent document 4: WO2015/064088
Patent document 5: WO2018/038064
Patent document 6: U.S. Pat. No. 8,269,981

DISCLOSURE OF THE INVENTION

The holography as shown in patent documents 1 to 5 described above can be applied to microscopic observation and/or shape measurement of a relatively small area, however, a technology capable of large area measurement is desired, for example, a technology applicable to flatness measurement and/or surface measurement of a semiconductor wafer whose diameter is increasing. Further, the interference measuring device as shown in patent document 6 described above uses Fizeau interference which is a general method for flatness measurement, however, due to the usage of the reference plane, there are following problems inherent in the Fizeau interference measuring device or Fizeau interferometer.

Fizeau interferometer is considered to be one of the most accurate and high-speed flatness measurement devices, and has been adopted as a flatness measurement device in standard equipment laboratories in various countries. In Fizeau interferometry, interference fringes, created between a light reflected by a reference plane of a transparent glass plate that serves as a standard plane and a light reflected by an object surface to be measured, are recorded in a hologram. To improve the measurement accuracy, the reference plane is moved slightly in the normal direction thereof to shift the phase of the interference fringes, and multiple set of interference fringes with different phases are recorded in multiple holograms and used to analyze the plane shape of the surface to be measured. The measurement result thus obtained is inevitably a comparison between the reference plane and the surface to be measured, and absolute shape correction of the reference plane is necessary to obtain an absolute value of the flatness. The three-sheet alignment method is used for the absolute shape correction.

The optical system of the Fizeau interferometer has a relatively small number of optical components and a simple structure in principle, however, practically, a tilt adjustment and/or vertical movement mechanism and a turntable for absolute shape measurement correction of the object to be measured are required in addition to the reference plane that serve as the measurement reference and collimating lens.

The accuracy of the measurement is affected by the uncertainty of the reference plane shape correction, the uncertainty of the phase shift, and the uncertainty due to environmental fluctuations. It is difficult to suppress the combined measurement uncertainty to 10 nm or less. As another problem, since the reference plane and the collimating lens are used, the dimension of the measurable object is limited to about 300 mm or less, and it is difficult to increase the diameter beyond that. Further, there is a problem that the contrast of the interference fringes is lowered for the surface to be measured having a reflectance greatly different from that of the reference plane made of glass, and this makes it difficult to perform highly accurate measurement.

The present invention is to solve the above-mentioned problems, and it is an object of the present invention to provide a surface shape measuring device and a surface shape measuring method which can improve measurement accuracy by a simple configuration without requiring a physical reference plane as a comparison standard of flatness and also without using a mechanical adjustment mechanism, In order to attain the above-mentioned subject, the surface shape measuring device using holography of the present invention, comprises:

a data acquisition unit for acquiring data of an object light (O) that is a reflected light of a spherical wave illumination light (Q) illuminating a surface to be measured and data of an inline spherical wave reference light (L) that is inline with respect to the object light (O), respectively, as an object light off-axis hologram ($I_{OR}$) and an reference light off-axis hologram ($I_{LR}$), using an image sensor; and an image reconstruction unit for deriving data of surface shape by reconstructing an image of the surface to be measured from the data acquired by the data acquisition unit, wherein the data acquisition unit comprises:

an optical system which is configured to make both an illumination light condensing point ($P_Q$) being a condensing point of the spherical wave illumination light (Q) and a reference light condensing point ($P_L$) being a condensing point of the inline spherical wave reference light (L) be arranged in a mirror image of each other with respect to a virtual plane (VP) being virtually set so as to contact the surface to be measured, and configured to make the inline spherical wave reference light (L) obliquely pass through the virtual plane (VP) and enter the image sensor, and the image reconstruction unit comprises:

an object light hologram generation unit for generating an object light hologram (g) representing the light wave of the object light (O) by a calculation process using the data of the two kinds of off-axis holograms ($I_{OR}$, $I_{LR}$), position information of the reference light condensing point ($P_L$), and the fact that the light emitted from the reference light condensing point ($P_L$) is a spherical wave;

a reconstructed object light hologram generation unit for generating a reconstructed object light hologram ($h^V$) on the virtual plane (VP) by performing a light wave propagation calculation and a rotational transformation on the object light hologram (g);

a reference point detection unit for detecting, by performing a light wave propagation calculation on the object light hologram (g), a position at which the object light (O) is condensing, and for setting the position as a reference point (S1), to be used for shape measurement, having more precise information than the position information of the reference light condensing point ($P_L$);

an analytical light hologram generation unit for analytically generating a spherical wave light hologram ($s^V$) that is a hologram on the virtual plane (VP), of a spherical wave light emitted from the reference point (S1); and a shape measuring unit for generating a measurement hologram ($J^V_{os}=h^V/s^V$) by dividing the reconstructed object light hologram ($h^V$) by the spherical wave light hologram ($s^V$), and for obtaining a height distribution of the surface to be measured of the object using a phase distribution of the measurement hologram ($J^V_{os}$).

Moreover, the surface shape measuring method using holography of the present invention, comprises the steps of:

arranging a reference light condensing point ($P_L$) being a condensing point of an inline spherical wave reference light (L) on an optical axis of an image sensor, arranging an illumination light condensing point ($P_Q$) being a condensing point of a spherical wave illumination light (Q) off the optical axis, and setting a virtual plane (VP) being a plane that bisects a line segment connecting the reference light condensing point ($P_L$) and the illumination light condensing point ($P_Q$) vertically;

arranging an object so that a surface to be measured is in contact with the virtual plane (VP), and acquiring data of an object light (O) being a reflected light of the spherical wave illumination light (Q) reflected from the surface to be measured as an object light off-axis hologram ($I_{OR}$) using the image sensor;

acquiring, in a state where the object is not arranged, data of the inline spherical wave reference light (L) passing through the virtual plane (VP) and being incident on the image sensor as a reference light off-axis hologram ($I_{LR}$) using the image sensor;

generating a complex amplitude inline hologram ($J_{OL}$) containing information on both the object light (O) and the inline spherical wave reference light (L) from the data of the two kinds of off-axis holograms ($I_{OR}$, $I_{LR}$);

generating an inline reference light hologram ($j_L$) representing a light wave of the inline spherical wave reference light (L) on a hologram plane being a light-receiving surface of the image sensor by performing a calculation process using the fact that the inline spherical wave reference light (L) is a spherical wave light;

generating an object light hologram (g) representing a light wave of the object light (O) using the complex amplitude inline hologram ($J_{OL}$) and the inline reference light hologram ($j_L$);

generating a reconstructed object light hologram ($h^V$) on the virtual plane (VP) by performing a light wave propagation calculation and a rotational transformation on the object light hologram (g);

detecting, by performing a light wave propagation calculation on the object light hologram (g), a position at which the object light (O) is condensing, and setting the position as a reference point (S1), to be used for shape measurement, having more precise information than the position information of the reference light condensing point ($P_L$);

generating a spherical wave light hologram ($s^V$) being a hologram on the virtual plane (VP) of a spherical wave light emitted from the reference point (S1); and generating a measurement hologram ($J^V_{os}=h^V/s^V$) by dividing the reconstructed object light hologram ($h^V$) by the spherical wave light hologram ($s^V$), and obtaining a height distribution of the surface to be measured of the object using a phase distribution of the measurement hologram ($J^V_{os}$).

According to the surface shape measuring device and the surface shape measuring method of the present invention, since the phase data of the reflected light of the spherical wave illumination light from the surface to be measured is acquired and the phase data is compared with the phase distribution in a plane cut surface of a spherical wave obtained analytically to perform the shape measurement, highly accurate surface shape measurement can be realized without requiring a physical reference plane such as a glass substrate.

BRIEF DESCRIPTION OF THE DRAWINGS

FIG. 1 is a flowchart showing the surface shape measuring method according to the 1st embodiment of the present invention.

FIG. 2 is a conceptual diagram for explaining the measuring method.

FIG. 3 is a flowchart showing a highly accurate method for determining the virtual plane in the measuring method.

MODE FOR CARRYING OUT THE INVENTION

Figure 4:
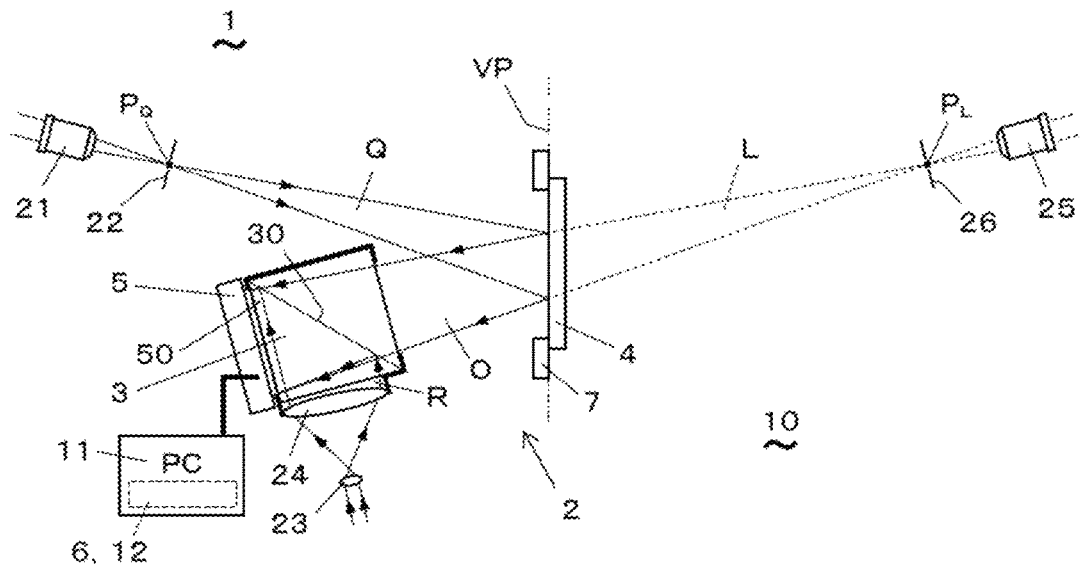
FIG. 4 is a side view showing how the object light off-axis hologram is acquired by the surface shape measuring device according to the 2nd embodiment.

Hereinafter, the surface shape measuring device and the surface shape measuring method according to embodiments of the present invention are described below with reference to the drawings.

1st Embodiment: Surface Shape Measuring Method

The surface shape measuring method according to the 1st embodiment is described with reference to FIG. 1 to FIG. 4. As shown in FIG. 1 and FIG. 2, the present surface shape measuring method is a method for measuring the shape of the surface to be measured of the object 4 by using holography, and comprises processes from the optical system arranging step (#1) to the surface shape measuring step (#8).

In the optical system arranging step (#1), the illumination light condensing point $P_O$ being a condensing point of the spherical wave illumination light Q and the reference light condensing point $P_L$ being a condensing point of the inline spherical wave reference light L are arranged so as to be mirror images of each other with respect to the virtual plane VP being set virtually. Further, the image sensor 5 is arranged on a straight line that obliquely passes through the virtual plane VP from the reference light condensing point $P_L$, and the base point $P_O$ indicating the position of the object 4 is set at the intersection position of the straight line and the virtual plane VP. Under these configurations, holograms of the spherical wave lights Q and L may be acquired by the image sensor 5 using the off-axis reference light R, reconstructed and confirmed in a computer, and the object 4 is arranged later. After that, the position and posture of the sample stage 7 and the entire optical system are adjusted. The spherical wave lights Q, L and the off-axis reference light R are mutually coherent laser lights emitted from one light source.

The position of each the condensing points $P_O$, $P_L$, that is, the light source of each spherical wave light Q, L is set by a pinhole position of a pinhole plate, for example. Further, the reference plane substrate 70 having a reference plane is arranged so that the reference plane is at the position of the virtual plane VP, and a hologram of a reflected light of the spherical wave illumination light Q is acquired. The degree of accuracy required for such confirmation, adjustment, and setting is about several tens of micrometers that can be adjusted by mechanical operation with a screw or the like. The process of increasing the measurement precision to the order of nm (nanometer) is performed, without using a piezoelectric element or the like, by using post-processing in the computer at the time of image reconstruction.

In the object light hologram acquiring step (#2), the object 4 is arranged at the position of the base point $P_O$ so that the surface to be measured is in contact with the virtual plane VP. The arrangement of the object 4 is performed by fixing it on the sample stage 7 adjusted in advance. The surface to be measured of the object 4 is obliquely illuminated by the spherical wave illumination light Q, and the data, of the reflected light which is emitted from the object 4 as the object light O and incident on the image sensor 5, is acquired using the off-axis reference light R as an object light off-axis hologram $I_{OR}$.

In the reference light hologram acquiring step (#3), the data of the inline spherical wave reference light L, which obliquely passes through the virtual plane VP and is incident on the image sensor 5 in a state in which neither the reference plane substrate 70 nor the object 4 is arranged, is acquired using the off-axis reference light R as a reference light off-axis hologram $I_{LR}$. Data of those two types of off-axis holograms $I_{OR}$, $I_{LR}$ are not acquired at the same time. Therefore, the irradiation condition and the like of the off-axis reference light R need to be kept the same when acquiring each data.

In the object light hologram generating step (#4), the object light hologram g representing the light wave of the object light O on the hologram plane 50 at the light receiving surface (z=0) is generated by data processing in the computer, using the object light off-axis hologram $I_{OR}$, the reference light off-axis hologram $I_{LR}$, and the fact that the inline spherical wave reference light L are a spherical wave light.

In the object light measurement hologram generating step (#5), the object light hologram g is converted into a hologram at the position of the base point $P_O$ by a light wave propagation calculation. Transforming a hologram to a hologram at another position by the light wave propagation calculation is called light propagation transformation. The position transformed hologram is rotationally transformed according to the virtual plane tilt angle $\alpha_O$ that is the tilt angle of the virtual plane VP with respect to the hologram plane 50, and the reconstructed object light hologram $h^V$ for measurement on the virtual plane VP is generated.

In the reference point detecting step (#6), the position where the object light O is condensed is detected by performing the light wave propagation calculation on the object light hologram g, and the detected position is set as the reference point S1 for shape measurement. The position information of the reference point S1 is more precise information than the position information of the reference light condensing point $P_L$. By using the position information of the reference point S1, it is possible to measure the surface to be measured with high accuracy.

In the spherical wave light hologram generating step (#7), a hologram of a spherical wave light emitted from the reference point S1 for shape measurement is analytically generated as the spherical wave light hologram $s^V$ on the virtual plane VP. The spherical wave light hologram $s^V$ realizes a reference plane, corresponding to the a conventional physical reference substrate that serves as a reference plane in the Fizeau interferometer, in a computer.

In the surface shape measuring step (#8), the reconstructed object light hologram $h^V$ is divided by the spherical wave light hologram $s^V$ to generate the measurement hologram $J^V_{os}$, which is a complex amplitude inline hologram relevant to the object light O and the spherical wave light hologram $s^V$, for the measurement. From the phase distribution of the measurement hologram $J^V_{os}$, the height distribution on the surface to be measured of the object 4, that is, the surface shape of the object 4 is obtained.

(Details of Virtual Plane Setting)

The initial setting of the sample stage 7 and the optical system shown in FIG. 2 is performed as follows, for example. The setting of the position and posture of the sample stage 7 has the same meaning as the setting of the position and posture of the virtual plane VP. The reference light condensing point $P_L$ being the condensing point of the inline spherical wave reference light L is arranged on the optical axis of the image sensor 5, and the illumination light condensing point $P_Q$ being the condensing point of the spherical wave illumination light Q is arranged at a position off the optical axis. The arrangements and settings of the light sources ($P_Q$, $P_L$) and the image sensor 5 are fixed thereafter.

The virtual plane VP is a plane that vertically bisects the line segment connecting the reference light condensing point $P_L$ and the illumination light condensing point $P_Q$. The base point $P_O$ indicating the position of the object 4 is set at the intersection of the virtual plane VP and the optical axis. The sample stage 7 is arranged at the position of the base point $P_O$ in an adjusted state. The sample stage 7 is adjusted so that the surface to be measured of the object 4 contacts the virtual plane VP when the object 4 is fixed on the sample stage 7. The adjustment of the sample stage 7 is performed as follows.

The reference plane substrate 70 having the reference plane is fixed on the sample stage 7 and illuminated with the spherical wave illumination light Q, and data of the reflected light from the reference plane is acquired as the object light off-axis hologram $I_{OR}$ using the off-axis reference light R. Data of the inline spherical wave reference light L, passing through the virtual plane VP and enters the image sensor 5 in a state where the reference plane substrate 70 is not arranged, is acquired as the reference light off-axis hologram $I_{LR}$ using the off-axis reference light R. The sample stage 7 is adjusted by changing the position and tilt, that is, the posture of the sample stage 7, so that the changes in the phase distribution of the complex amplitude inline hologram $J_{OL}$ obtained by dividing the real image component of the object light off-axis hologram $I_{OR}$ by the real image component of the reference light off-axis hologram $I_{LR}$ is reduced.

Explanation is made more specifically. First, without the object 4, the condensing points of the inline spherical wave reference light L and the spherical wave illumination light Q are arranged, and the interference fringes $I_{LR}$ generated by the inline spherical wave reference light L and the off-axis reference light R are recorded. Next, the reference plane substrate 70 having a reference plane of high flatness such as an optical flat is fixed on the sample stage 7 as the object 4 and illuminated with the spherical wave illumination light Q. And then, the distance $z_O$ and the tilt angle $\alpha_O$ of the sample stage 7 are adjusted mechanically, so that the symmetry point of the illumination light condensing point $P_Q$ with respect to the reference plane of the reference plane substrate 70 approaches the reference light condensing point $P_L$, in other words, the reference plane of the reference plane substrate 70 moves to the reference light condensing point $P_L$, after that, the interference fringes $I_{OR}$ generated by the object light O being a light reflected from the reference plane and the off-axis reference light R are recorded in one shot.

By performing spatial frequency filtering to extract the complex amplitude off-axis holograms $J_{OR}$ and $J_{LR}$ representing the real image components, respectively, from the interference fringes $I_{OR}$ and $I_{LR}$, and by dividing $J_{OR}$ by $J^{LR}$, the complex amplitude inline hologram $J_{OL}$ is obtained. The phase ($\theta_O - \theta_L$) of the complex amplitude inline hologram $J_{OL}$ represents the phase difference between the inline spherical wave reference light L and the object light O (which is regarded as a spherical wave) on the hologram plane 50. When the symmetry point of the illumination light condensing point $P_Q$ approaches the reference light condensing point $P_L$, the phase component $\exp[i(\theta_O - \theta_L)]$ of $J_{OL}$ approaches a constant value distribution on the hologram plane 50. Further, when the symmetry point of the point $P_O$ moves away from the point $P_L$, the phase component $\exp[i(\theta_O-\theta_L)]$ becomes a changing value distribution.

When the separation distance between the symmetry point of the point $P_O$ and the reference light condensing point $P_L$ becomes the resolution $\delta=\lambda/(2NA)$ or more in the direction perpendicular to the z axis, or becomes the depth of focus $DOF=\lambda/(2NA^2)$ or more in the z axis direction, the distribution of the phase component $\exp[i(\theta_O-\theta_L)]$ changes oscillatory on its hologram plane. Here, NA is the numerical aperture of the recorded hologram.

By adjusting the distance $z_O$ and the tilt angle $\alpha_O$ so that the changes in the phase component $\exp[i(\theta_O-\theta_L)]$ of the complex amplitude inline hologram $J_{OL}$ is sufficiently small, a plane in contact with the reference plane of the reference plane substrate 70 is determined as the virtual plane VP, and the adjustment of the sample stage 7 is completed. The reference light L and the illumination light Q became symmetrical with respect to the determined virtual plane VP sandwiched therebetween, and the two-dimensional distribution of the phase difference $(\theta_O-\theta_L)$ between the illumination light Q and the reference light L on the virtual plane VP becomes almost a constant value of small change.

By the way, when the unevenness height t of the surface shape to be measured with accuracy $\Delta t$, the mechanical adjustments, at the time of determining the virtual plane VP, are required to be performed so that the phase change $\Delta(\theta_0-\theta_L)$ becomes smaller than $4\pi\Delta t/\lambda$, namely, $\Delta(\theta_0-\theta_L)<4\pi\Delta t/\lambda$. This kind of adjustment is difficult to perform mechanically only with screws without using a piezoelectric drive element such as PZT, and the measurement accuracy $\Delta t$ on the nm order cannot be expected, however, improvements of the measurement accuracy $\Delta t$ are possible by performing post-processing in the computer at the time of image reconstruction.

(Hologram Data and its Processing)

Explanation of hologram data and its processing based on mathematical expressions is made. In the hologram, the off-axis reference light R, the inline spherical wave reference light L, the object light O, etc are involved. Here, the origin of the xyz right-handed orthogonal coordinate system is set at the center of the hologram plane 50 (light receiving surface of the image sensor 5) (the coordinate system regarding the virtual plane VP is x'y'z', see FIG. 2). The direction from the hologram plane 50 toward the light source of the object light O is the positive direction of the z axis. By using the position coordinates (x, y), the object light O(x, y, t), the off-axis reference light R(x, y, t), and the inline spherical wave reference light L(x, y, t) are expressed by the following general equations (1), (2), and (3), respectively. Those lights having angular frequency $\omega$ are coherent with each other. Coefficients, arguments, subscripts, etc. in each equation are interpreted in a general expression and meaning. In each of the following equations, the position coordinates (x, y, z), the spatial frequency (u, v, w), etc. are omitted as appropriate.

$$O(x,y,t)=O_0(x,y)\exp[i(\phi_O(x,y)-\omega t)] \quad (1)$$

$$R(x,y,t)=R_0(x,y)\exp[i(\phi_R(x,y)-\omega t)] \quad (2)$$

$$L(x,y,t)=L_0(x,y)\exp[i(\phi_L(x,y)-\omega t)] \quad (3)$$

The light intensity $I_{OR}(x, y)$ of a light composed of L(x, y, t) and R(x, y, t), and the light intensity $I_{LR}(x, y)$ of a light composed of O(x, y, t) and R(x, y, t) are expressed by the following equations (4) and (5), respectively. Those light intensities $I_{OR}$ and $I_{LR}$ are acquired as hologram data by the image sensor 5.

$$I_{OR}(x,y)=O_0^2+R_0^2+O_0R_0\exp[i(\phi_O-\phi_R)]+O_0R_0\exp[-i(\phi_O-\phi_R)] \quad (4)$$

$$I_{LR}(x,y)=L_0^2+R_0^2+L_0R_0\exp[i(\phi_L-\phi_R)]+O_0R_0\exp[-i(\phi_L-\phi_R)] \quad (5)$$

In the above equations (4) and (5), the 1st term on the right side is the light intensity component of the object light O or the inline spherical wave reference light L, and the 2nd term is the light intensity component of the off-axis reference light R. The 3rd term and the 4th term of each equation are a direct image component and a conjugate image component, which are created as modulation results of the object light O or the inline spherical wave reference light L made by the off-axis reference light R, respectively.

The direct image component of the 3rd term includes information of the object light O or the reference light L necessary for the present data processing method, that is, $O_0\exp(i\phi_O)$ or $L_0\exp(i\phi_L)$ of the above equations (1) and (3). In the direct image component of the 3rd term, the phase portions $[i\phi_O]$ and $[i\phi_L]$ of the object light O or the reference light L is equal to the phase portion $[i\phi_O]$ or $[i\phi_L]$ in above equations (1) and (3) defining those lights. On the other hand, in the 4th term, the phase portions $[-i\phi_O]$ or $[-i\phi_L]$ of the object light O or the reference light L is a complex conjugate of the phase portion $[i\phi_O]$ or $[i\phi_L]$ in above equation (1) or (3) defining those light, and accordingly, the 4th term is called a conjugate image component.

By using the off-axis reference light R and its off-axis effect, such a hologram can be acquired in which the direct image component (the 3rd term) is separated from the light intensity components (the 1st and 2nd terms) and the conjugate image component (the 4th term) when the hologram is expressed in a spatial frequency space. Therefore, by applying spatial frequency filtering, only the 3rd terms of above equations (4) and (5) are extracted, and the object light complex amplitude hologram $J_{OR}$ in which the object light O is recorded and the complex amplitude hologram $J_{LR}$ in which the inline spherical wave reference light L is recorded are derived, respectively, as shown in the following equations (6) and (7). Those complex amplitude holograms are holograms still containing the components of off-axis reference light R.

$$J_{OR}(x,y)=O_0(x,y)R_0(x,y)\exp[i(\phi_O(x,y)-\phi_R(x,y))] \quad (6)$$

$$J_{LR}(x,y)=L_0(x,y)R_0(x,y)\exp[i(\phi_L(x,y)-\phi_R(x,y))] \quad (7)$$

The spatial frequency filtering is performed by Fourier transforming above equations (4) and (5) into equations expressed in the spatial frequency space, filtering using bandpass filter, and then inverse-Fourier transforming. For reference, if the pixels in the image sensor are two-dimensionally arranged with a pixel pitch d, the highest spatial frequency fs of the hologram, recordable by using such a image sensor, becomes a spatial frequency fs=1/d.

By dividing above equation (6) by equation (7), the amplitude $R_0$ and the phase $\phi_R$ of the off-axis reference light R can be removed from the equation (6). This processing is processing for performing phase subtraction, that is, processing for frequency conversion, and is processing for heterodyne modulation. As a result, the complex amplitude inline hologram $J_{OL}$ of the object light O with respect to the inline spherical wave reference light L is obtained as shown in the following equation (8).

$$J_{OL}(x,y)=(O_0(x,y)/L_0(x,y))\exp[i(\phi_O(x,y)-\phi_L(x,y))] \qquad (8)$$

The inline spherical wave reference light L is a reference light for acquiring and storing the data of the reference light R as the reference light hologram $I_{LR}$ which is an off-axis hologram, and also serves as a standard light in digital processing of hologram data. The inline spherical wave reference light L is used to generate the complex amplitude inline hologram $J_{OL}$ that is a hologram not including the data of the reference light R. If the off-axis reference light R is maintained under the same conditions while a plurality of object light holograms $I_{OR}$ are acquired, it is enough to acquire one reference light hologram $I_{LR}$ and to generate one complex amplitude hologram $J_{LR}$.

(Component of Inline Spherical Wave Reference Light L and Multiplication Factor)

Next, by multiplying both sides of equation (8) by a multiplication factor $L_0(x, y)\exp[i\phi_L(x, y)]$, an amplitude modulation by the amplitude factor $L_0(x, y)$ and a heterodyne modulation by the phase factor $\exp[i\phi_L(x, y)]$ is performed, and the object light hologram g(x, y) representing the light wave of the object light O on the surface of the image sensor 5 (hologram plane, xy plane, or plane z=0) can be generated, as shown in the following equation (9). The process for generating the object light hologram g(x, y) is a process for reconstructing the object light O. The light intensity distribution of the object light O on the hologram plane 50 can be viewed as an image by displaying the square of the absolute value $|g(x, y)|^2$ of the object light hologram g(x, y).

$$g(x,y)=O_0(x,y)\exp[i\phi_O(x,y)] \qquad (9)$$

This multiplication process is a process for removing the component of the inline spherical wave reference light L from above equation (8), and the hologram g only containing the light wave $O_0(x, y)\exp[i\phi_O(x, y)]$ of the object light O is generated. The term "hologram" is used in the sense that it contains all the data necessary to reconstruct the light wave, and will be used interchangeably below. The amplitude $L_0(x, y)$ of the inline spherical wave reference light L may be left if it changes gently and can be ignored.

The multiplication factor $L_0(x, y)\exp[i\phi_L(x, y)]$ is a hologram representing a light wave reaching the image sensor 5, namely, the hologram plane 50 after being emitted from the condensing point $P_L$ of the inline spherical wave reference light L as a spherical wave and propagating in the air, and thus this hologram is referred to as an inline reference light hologram $j_L$. The inline reference light hologram $j_L$ reaches the hologram plane 50 as a spherical wave if it propagates only in the air to the hologram plane 50. Therefore, the multiplication factor can be analytically obtained using the position information of the condensing point $P_L$.

Note that, as in the optical system in FIG. 4 described later, when the inline spherical wave reference light L passes through the beam coupler 3 and the like, the wave front at the hologram plane 50 is a wave front deformed from a spherical wave. In that case, the hologram $j_L$ can not be calculated analytically, but can be derived by light propagation calculation using plane wave expansion if the distance ρ from the condensing point $P_L$ of the inline spherical wave reference light L to the hologram plane 50 and the thickness dimension A of the beam coupler 3 are given (described later).

(Measurement of Distances ρ and $z_O$, and Tilt Angle $\alpha_O$)

In order to measure the surface shape, it is necessary to reconstruct the reflected light at the the surface to be measured, that is, at a position parallel to the virtual plane. Therefore, in order to reconstruct the reflected light using the complex amplitude inline hologram, following values are required: the distance $z_O$ from the image sensor 5 or the hologram plane 50 to the surface to be measured or the virtual plane VP, the tilt angle $\alpha_O$ of the virtual plane VP with respect to the hologram plane 50, and the distance ρ from the hologram plane 50 to the reference light condensing point $P_L$ being the condensing point of the inline spherical wave reference light L. Those values can be measured by any other measuring means, but can be obtained using holography with high accuracy by acquiring and reconstructing a target image.

In the optical system shown in FIG. 2, a flat target, composed of a transparent flat glass substrate having a pattern whose dimensions are accurately known, is fixed on the adjusted sample stage 4 so that the pattern contacts the virtual plane VP. Next, the flat target is illuminated with the inline spherical wave reference light L, and the interference fringes $I_{OR}$ formed by the object light O, which is the inline spherical wave reference light L transmitted through the target and the off-axis reference light R, is recorded. From the recorded interference fringes $I_{OR}$ and $I_{LR}$, the object light g on the hologram plane 50 is obtained, and then plane wave expansion and light propagation calculation are performed on the object light g and also rotational transformation is performed to reconstruct a focused image on the target surface as described below.

(Plane Wave Expansion and Light Propagation Calculation)

A plane wave is an exact solution of the Helmholtz equation for electromagnetic waves. The light wave of the object light O can be expanded with the plane waves which are the exact solution. The plane wave expansion is executed by Fourier transforming the object light hologram g(x, y) of above equation (9). That is, the Fourier transform is the plane wave expansion. As a result of the plane wave expansion, a spatial frequency spectrum G(u, v) of the object light O is obtained as shown in the following equation (10). The spatial frequency spectrum G(u, v) is the complex amplitude of the plane wave having the wave number vector (u, v) and is also referred to as the complex amplitude G(u, v). At the position translated by the distance $z_O$ from the hologram plane 50, a spatial frequency spectrum H(u, v) of the object light O is given by the following equation (11), and an object light h(x, y, $z_O$) is obtained by the following equation (12).

$$G(u,v)=\iint g(x,y)\exp[-i2\pi(ux+vy)]dxdy \qquad (10)$$

$$H(u,v)=G(u,v)\exp[i2w(u,v)z_O] \qquad (11)$$

$$h(u,v,z_O)=\iint H(u,v)\exp[i2\pi(ux+vy)]dudv \qquad (12)$$

$$w(u,v)=\sqrt{(1/\lambda)^2-u^2-v^2}$$

(Rotational Transformation)

A spatial frequency spectrum $H^V(u', v')$ after the rotational transformation by the tilt angle $\alpha_O$ is given by the following equation (13), and the Jacobian J(u', v') of the rotational transformation is given by the following equation (14). Therefore, a reconstructed object light $h^V(x', y', z_O)$ after the rotational transformation is given by the following equation (15).

$$H^V(u',v')=H(u'\cos\alpha_0-w'\sin\alpha_O,v')J(u',v') \qquad (13)$$

$$J(u',v')=\cos\alpha_0-(u'/w')\sin\alpha_O \qquad (14)$$

$$h^V(x',y',z_O)=\iint H^V(u',v')\exp[i2\pi(u'x'+v'y')]du'dv' \qquad (15)$$

At the base point $P_O$, a reconstructed image parallel to the hologram plane 50 before the rotational transformation is obtained by $|h|^2$, and a reconstructed image parallel to the virtual plane VP after the rotational transformation is obtained by $|h^V|^2$. The reconstructed object light $h^V$ includes the distance $z_O$ and the distance $\rho$ as parameters. At least around the base point $P_O$, the distance $z_O$ is obtained as a z coordinate value of a reconstruction surface when an in-focus reconstructed image is obtained, and the distance $\rho$ is obtained as a parameter value when the size of the in-focus reconstructed image matches the actual size of the target. Further, the reconstructed object light $h^V$ includes the tilt angle $\alpha_O$ in addition to the distance $z_O$ and the distance $\rho$ as parameters. When the in-focus reconstructed image is obtained on the entire surface, the tilt angle $\alpha_O$ is obtained as a value of the rotational transformation angle.

(High-Precision Determination of Reference Point and Virtual Plane for Shape Measurement Using Correlation Function)

Next, highly accurate determination of the virtual plane VP is explained. Here, the distance and the measurement accuracy is described. The inline spherical wave reference light L is a light used only for reconstructing holograms, and the distance $\rho$ to the reference light condensing point $P_L$ is a distance measured in mm order. For the shape measurement, the reference light condensing point $P_L$ is not used, but a reference point and a reference point light source set there are used, wherein the reference point is searched for and newly set in the vicinity of the reference light condensing point $P_L$. This reference point is given as a true mirror image point of the illumination light condensing point $P_Q$. This reference point is searched and set by post-processing on the computer using the correlation function calculation so that it substantially comes to the position of the original mirror image point of the illumination light condensing point $P_Q$.

In order to secure the required measurement accuracy, it is necessary to make the difference $\Delta D_{QS}=|D_Q-D_S|$ between the distances $D_Q$ and $D_Q$ smaller than the required measurement accuracy, wherein $D_Q$ is the distance between the base point $P_O$ and the illumination light condensing point $P_Q$ and $D_S$ is the distance between the base point $P_O$ and the reference point light source for shape measurement. This is realized by post-processing on a computer. This post-processing is a processing for increasing the number of significant digits.

In determining the virtual plane VP using the reference plane substrate described above, the distance $z_O$ of the reference plane and the tilt angle $\alpha_O$ are mechanically adjusted. Here, a method for determining the reference point light source for shape measurement with high accuracy by calculation using a correlation function of a point light source and the reconstructed object light is described. The determining of the reference point light source with high precision means the matching of the reference point light source for shape measurement with a symmetry point P1 of the illumination light condensing point $P_Q$. In order to do this, the position of the point P1, which is considered to be in the immediate vicinity of the reference light condensing point $P_L$, is obtained by numerical calculation using a correlation function of lights.

As shown in the flowchart of FIG. 3, the object light hologram g for the object light O that is the reflected light of the illumination light Q is propagated to the position $z=\rho$ of the reference light condensing point $P_L$ by the light propagation calculation, and the generated hologram is set as an evaluation hologram $h0=h(x, y, \rho)$ (#61). Next, by the correlation function calculation between a probe function $f\rho$ representing a point light source and the evaluation hologram h0, position coordinates (x1, y1, $\rho$) of a condensing point, at which the object light O (reflected light of the illumination light Q) condenses, are detected in the plane of the evaluation hologram h0 and set as a temporary condensing point P1(x1, y1, $\rho$) (#62).

By fixing the position (x1, y1) of the temporary condensing point P1 in a plane orthogonal to the optical axis, by tentatively propagating the evaluation hologram $h0=h(x, y, \rho)$ in the optical axis direction by light propagation calculation, and by performing the correlation function calculation, a condensing point of the object light O in the optical axis direction is detected, and thus the position coordinates (x1, y1, z1), $z1=\rho+\Delta\rho$ of the condensing point P1 are detected (#63). The detected condensing point P1(x1, y1, z1) is set as the reference point S1 for shape measurement, and a point light source of reference light is set there (#64).

The above processes are specifically explained using mathematical expressions. The evaluation hologram $h0=h(x, y, \rho)$ is given by the following equation (16) (#61). The probe function $f\rho$ is a virtual point light source $f\rho=\delta(x-x1)\delta(y-y1)$ placed at coordinates (x1, y1, $\rho$). The correlation function C is given by the following equation (17).

$$h(x,y,\rho)=\iint G(u,v)\exp[i2\pi w(u,v)\rho]\cdot\exp[i2\pi(ux+vy)]\,du\,dv \quad (16)$$

$$C(x_1,y_1,\rho)=\iint h(u,v,\rho)\delta(x-x_1)\delta(y-y_1)dxdy=\iint G(u,v)\exp[i2\pi w(u,v)\rho]\cdot\exp[i2\pi(ux_1+vy_1)]du\,dv \quad (17)$$

The correlation function $C(x1, y1, \rho)$ includes the coordinates (x1, y1) of the virtual point light source in the plane as a parameter. The coordinates (x1, y1) are obtained by numerical calculation as parameter values that maximize the absolute value $|C(x1, y1, \rho)|$ of the correlation function (#62).

Next, in the equation (17), the values of (x1, y1) are fixed, $\rho$ is replaced with a parameter z1, and the value of z1 is obtained as a z1 value which gives the maximum of the absolute value $|C(x1, y1, z1)|$. As a result, the position coordinates (x1, y1, z1) of the mirror image point P1 are detected (#63). By the calculation using such a correlation function, the coordinates (x1, y1) can be obtained with much higher precision than the resolution $\delta=\lambda/(2NA)$, and the value of z1 can be obtained with much higher precision than the depth of focus $DOF=(2NA^2)$. By the above calculation, the coordinates (x1, y1, z1) of the point P1 which is set as the reference point S1 can be accurately determined by numerical calculation at the position of the reference light condensing point $P_L$ or in the vicinity thereof (#64).

As described above, the reference point S1 for shape measurement is newly arranged at the point P1 by using the correlation function C, and a light generated by a point light source arranged at this reference point S1 (hereinafter, the light generated by the reference point light source S1) is a spherical wave light and referred to as an inline spherical wave reference light L1. The phase of the reference light L1 generated by the reference point light source S1 can be accurately calculated using the analytical solution of the spherical wave. On the virtual plane VP, the phase of the illumination light Q and the phase of the reference light L1 match each other over the entire virtual plane VP.

When the reconstructed object light hologram $h^V(x', y')$ is divided by the spherical wave light hologram $s^V(x', y')$, the measurement hologram $J^V_{os}(x', y')$ for measuring the surface to be measured is obtained. The height distribution $t(x', y')$ of the surface to be measured is obtained from the optical path difference between the illumination light Q reflected by the surface to be measured and the illumination light Q reflected by the virtual plane VP. The phase of the inline spherical wave reference light L1 having the reference point S1 as the light source matches the phase of the illumination light Q on the virtual plane VP. Therefore, the height distribution t(x', y') is obtained by the following equation (18) using the phase $(\theta_O - \theta_{L1})$ of the measurement hologram $J^V_{os}$. Here, the phase $\theta_O$ is the phase of the reconstructed object light obtained from the reconstructed object light hologram $h^V$, the phase $\theta_{L1}$ is the phase of the reference light L1 generated by the reference point light source S1, and the angle $\alpha(x', y')$ is the incident angle of the illumination light Q at the coordinate (x', y').

$$t(x', y') = -\frac{(\theta_O(x', y') - \theta_{L1}(x', y'))}{4\pi} \lambda \cos \alpha(x', y') \quad (18)$$

(2nd Embodiment: Surface Shape Measuring Device)

The surface shape measuring device 1 according to the 2nd embodiment is described with reference to FIG. 4 and FIG. 5. The surface shape measuring device 1 is a device that measures the shape of the surface to be measured of the object 4 by using holography, and comprises the data acquisition unit 10 for acquiring the data of holograms of the surface to be measured of the object 4, and the image reconstruction unit 12 for reconstructing images on the surface to be measured from the holograms acquired by the data acquisition unit 10.

The data acquisition unit 10 comprises: the image sensor 5 for converting light intensity into electric signals and outputting them as hologram data; the sample stage 7 for fixing the object 4 so that the surface to be measured of the object 4 contacts the virtual plane VP being virtually set; and the optical system 2 for propagating each light. The image sensor 5 is connected to the computer 11 as a control unit and a memory.

The optical system 2 comprises two optical systems for the spherical wave illumination light Q and for the inline spherical wave reference light L, which are symmetrically arranged on both sides of the virtual plane VP that is virtually set, the beam coupler 3 arranged in front of the image sensor 5 and composed of a cube-type beam splitter, and an optical system for the off-axis reference light R.

The spherical wave illumination light Q is a light that illuminates the surface to be measured of the object 4 from an oblique direction and causes the image sensor 5 to record the reflected light including the surface shape information of the object 4, that is, the object light O. The optical path of the illumination light Q is provided with the lens 21 for condensing parallel light and the pinhole plate 22 having a pinhole at the condensing position. The position of the pinhole is the condensing point of the illumination light Q, namely, the illumination light condensing point $P_Q$, and is the position of the point light source of the spherical wave light.

The optical path of the inline spherical wave light L, like the illumination light Q, is provided with the lens 25 for condensing parallel light and the pinhole plate 26 having a pinhole at the condensing position. The position of the pinhole of the pinhole plate 26 is the condensing point of the inline reference light L, namely, the reference light condensing point $P_L$, and is the position of the point light source of the spherical wave light. The inline spherical wave light L becomes an inline light with respect to the object light O which is the reflected light of the illumination light Q. The recording of the reference lights L and R is used for replacing the component of the off-axis reference light R in the recorded hologram of the object light with the component of the inline spherical wave light L, to remove the component, and to make the recording hologram inline.

The object light O and the inline spherical wave reference light L pass through the beam coupler 3 and enter the image sensor 5 from the front. That is, the illumination light condensing point $P_Q$ and the reference light condensing point $P_L$ are optically inline and exist at the same optical position in the direction perpendicular to the center of the light receiving surface of the image sensor 5.

The off-axis reference light R, enters the beam coupler 3 from the side thereof, is reflected by the internal reflecting mirror 30, and enters the image sensor 5. The optical path is provided with the small diameter lens 23 for expansion and the large-diameter lens 24 for collimation, and the off-axis reference light R formed in a spherical wave like shape is generated.

In the optical system 2, the illumination light condensing point $P_Q$ being the condensing point of the spherical wave illumination light Q and the reference light condensing point $P_L$ being the condensing point of the inline spherical wave reference light L are set to be a mirror image arrangement mutually relative to the virtual plane VP. Further, the optical system 2 propagates each light, so that the illumination light Q illuminates the surface to be measured obliquely, the object light O being reflected light thereof enters the image sensor 5, and the inline spherical wave reference light L obliquely passes through the virtual plane VP and is incident on the image sensor 5.

The beam coupler 3 combines the object light O or the inline spherical wave reference light L and the off-axis reference light R and makes them incident on the image sensor. A cube-type beam splitter may be used as the beam coupler 3.

The image reconstruction unit 12 is provided in the computer 11 together with the data storage unit 6. The image reconstruction unit 12 is configured to include a memory and a software group for executing the surface shape measuring method described in the 1st embodiment.

Figure 5:
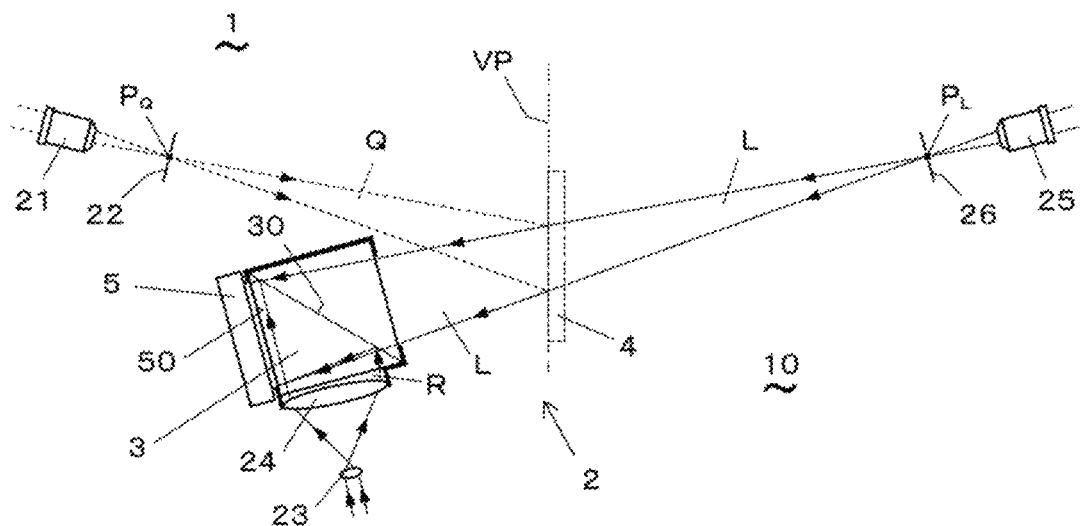
FIG. 5 is a side view showing how the reference light off-axis hologram is acquired by the device.

In the surface shape measurement of the surface to be measured of the object 4, as shown in FIG. 4, the recording hologram $I_{OR}$ of the object light O being reflected light is acquired using the spherical wave illumination light Q and the off-axis reference light R in the state that the object 4 is arranged. Further, as shown in FIG. 5, the recording hologram $I_{LR}$ of the off-axis reference light R is acquired using the inline reference light L in the state that the object 4 is removed.

The acquired off-axis holograms $I_{OR}$, $I_{LR}$ are processed by the surface shape measuring method described in the 1st embodiment to obtain surface shape measurement values. By the way, since the surface shape measuring device 1 of the present embodiment includes the cube-type beam coupler 3, it is necessary to perform the light propagation calculation on the light passing through the beam coupler 3 using the plane wave expansion method in consideration of the refractive index of the beam coupler 3. Below, the process regarding the beam coupler 3 is described.

(Calculation of Spherical Wave after Passing Through Beam Coupler)

In order to generate the object light hologram g from the complex amplitude hologram $J_{OL}$ on the hologram plane 50, the light wave of the inline spherical wave reference light L having reached the hologram plane 50 through the beam coupler 3 (inline reference light hologram $j_L$) is necessary.

The inline reference light hologram $j_L$ is not a spherical wave because it has passed through the beam coupler 3. Therefore, by performing the light propagation calculation on a light wave propagating from the position of the condensing point $P_L$ of the inline spherical wave reference light L to the hologram plane 50 being the incident surface of the image sensor 5, the inline reference light hologram $j_L$, namely, the inline spherical wave reference light L on the hologram plane 50 is generated.

The light propagation calculation is performed using the plane wave expansion. The inline reference light hologram $j_L$ is derived by performing the plane wave expansion on the reference light L at the condensing point $P_L$, propagating each plane wave component in the air and in the beam coupler 3 to calculate each plane wave component on the hologram plane 50, and adding up the calculated plane wave components to form the inline reference light hologram $j_L$. The point light source $b_0\delta(x)\delta(y)$ of the inline spherical wave reference light L exists on the xy plane at the position $z=\rho$ of the condensing point $P_L$. An spatial frequency spectrum $B(u, v)$ of this point light source is a constant value $b_0$, namely, $B(u, v)=b_0$. Therefore, due to the propagation of the plane wave, the inline spherical wave reference light L on the hologram plane 50 at z=0, namely, the inline reference light hologram $j_L$ is given by the following equations (19).

$$j_L = L_0(x, y)\exp(i\phi_L(x, y)) \quad (19)$$

$$= b_0 \int\int \exp\{-i2\pi[w_n(u, v)A + w(u, v)(\rho - A)]\}$$

$$\cdot \exp[i2\pi(ux + vy)]dudv$$

$$w(u, v) = \sqrt{(1/\lambda)^2 - u^2 - v^2}$$

$$w_n(u, v) = \sqrt{(n/\lambda)^2 - u^2 - v^2}$$

In the above equation, n is the refractive index of the beam coupler 3. The above equation (19) is a function of the distance $\rho$ from the origin z=0 to the condensing point $P_L$ and the dimension A of the beam coupler 3, but is independent of the distance from the origin to the beam coupler 3. That is, the same equation is obtained regardless of the position of the beam coupler 3. The above equation (19) is a theoretical calculation equation, and in actual calculation, it is necessary to perform the light propagation calculation with the number of calculation points satisfying the sampling theorem.

(Object Light g(x, y) on Hologram Plane)

The inline reference light hologram $j_L$ of the above equation (19) obtained by the above procedure is the light wave of the inline spherical wave reference light L that has passed through the beam coupler 3 and reached the hologram plane 50. By multiplying the above equation (8) by the multiplication factor $j_L$ composed of this hologram $j_L=L_0(x, y)\exp[i\phi_L(x, y)]$, the object light hologram g(x, y) representing the light wave of the object light O on the surface of the image sensor 5 (hologram plane, xy plane, or plane z=0) is obtained in the same manner as in the above equation (9).

(Light Propagation Calculation)

As a result of the plane wave expansion, namely, the Fourier transformation of the object light hologram g(x, y) on the hologram plane, a spatial frequency spectrum G(u, v) for the object light O is obtained as in the following equation (20). Expressionally, it is the same as the above equation (10). By the light propagation calculation of the plane waves, an object light h(x, y) on a plane parallel to the hologram plane 50 at the position $z=z_O$ of the surface to be measured of the object 4 is obtained by the following equation (21).

$$G(u,v)=\iint g(x,y)\exp[-2\pi(ux+vy)]dxdy \quad (20)$$

$$h(x,y)=\iint G(u,v)\exp\{i2\pi[w_n(u,v)A+w(u,v)(z_O-A)]\}\cdot\exp[i2\pi(ux+vy)]dudv \quad (21)$$

In the above equation (20), u and v are Fourier spatial frequencies in the x direction and the y direction, respectively. The Fourier spatial frequencies w and $w_n$ in the z direction are obtained from the dispersion equation of the plane wave (the relational equation between the wave number and the wavelength) as annotated in the above equation (19). The dispersion equation includes the refractive index n in the form $(n/\lambda)^2$. The above equations (20) and (21) are calculation equations in consideration of the size A and the refractive index n of the beam coupler 3 existing on the optical path.

The object light h(x, y) on a plane parallel to the hologram plane 50 at the position $z=z_O$ of the surface to be measured of the object 4 is obtained by the above equation (21), and thus by executing the processes of the rotational transformation of the above equations (13) to (18), the highly accurate determination of the virtual plane using the correlation function, and the calculation of the height distribution, the surface shape measurement can be executed and the measurement result can be obtained. The processes of the above equations (13) to (18) are processes on phenomena in the air, and it is not necessary to consider the influence of the refractive index n of the beam coupler 3 and the like.

3rd Embodiment

Figure 6:
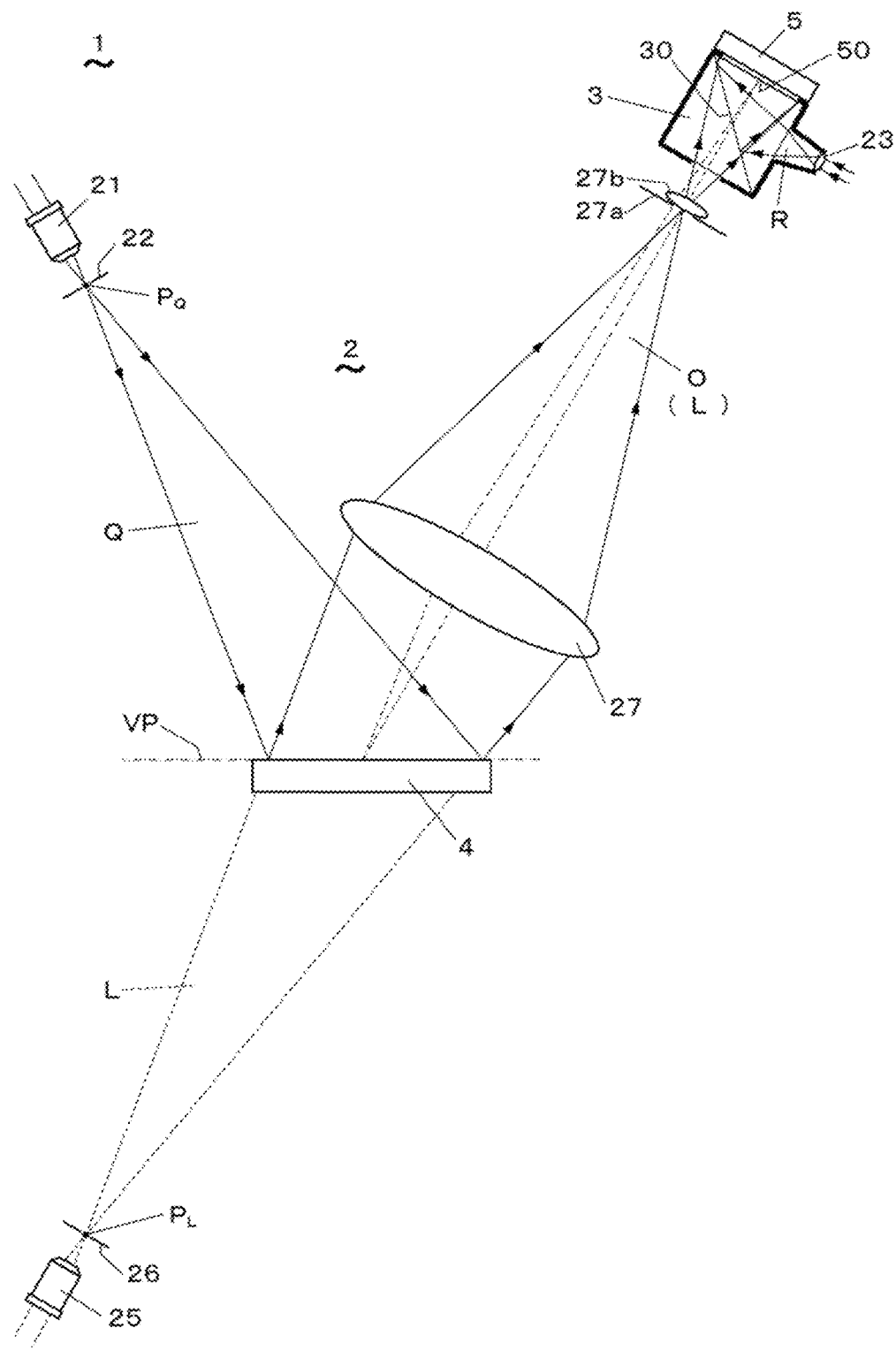
FIG. 6 is a side view showing a state in which the object light off-axis hologram is acquired by the surface shape measuring device according to the 3rd embodiment.

The surface shape measuring device 1 according to the 3rd embodiment is described with reference to FIG. 6. The surface shape measuring device 1 according to the present embodiment is the same as the surface shape measuring device 1 according to the 2nd embodiment, except that the optical system 2 comprises the condenser lens 27 for condensing the object light O and the inline spherical wave reference light L, the pupil plate 27a arranged at the condensing position defined by the condenser lens 27 so as to limit the amount of passing light, and the imaging lens 27b arranged in combination with the pupil plate 27a. The two lenses provided in front of and behind the pupil plate 27a are lenses for imaging the object light O and the inline spherical wave reference light L on the image sensor 5.

If a large-diameter hologram can be recorded, the surface shape of a large object can be measured. As a method for recording a large diameter hologram, a method of using a number of image sensors arranged on a plane or a method using an image sensor moving on a plane can be considered, however, as in this embodiment, a large diameter hologram can be recorded using one image sensor 5 by condensing a reflected light using a lens. The inline spherical wave reference light L or the object light O is projected on the light receiving surface of the image sensor 5 by using the condenser lens, and the interference fringes formed by the off-axis reference light R are recorded. The width of the spatial frequency band of the recording hologram can be adjusted by opening and closing the pupil of the pupil plate 27a. When the surface to be measured is smooth and has high flatness, the spatial frequency bandwidth becomes narrow, and when the surface to be measured has fine irregularities, the bandwidth becomes wide.

Since the two lenses of the condenser lens 27 and the imaging lens 27b make an image of the light from the surface to be measured on the light receiving surface of the image sensor 5, the shape of the surface to be measured can be observed or measured without performing the reconstruction of the object light.

4TH EMBODIMENT

Figure 7:
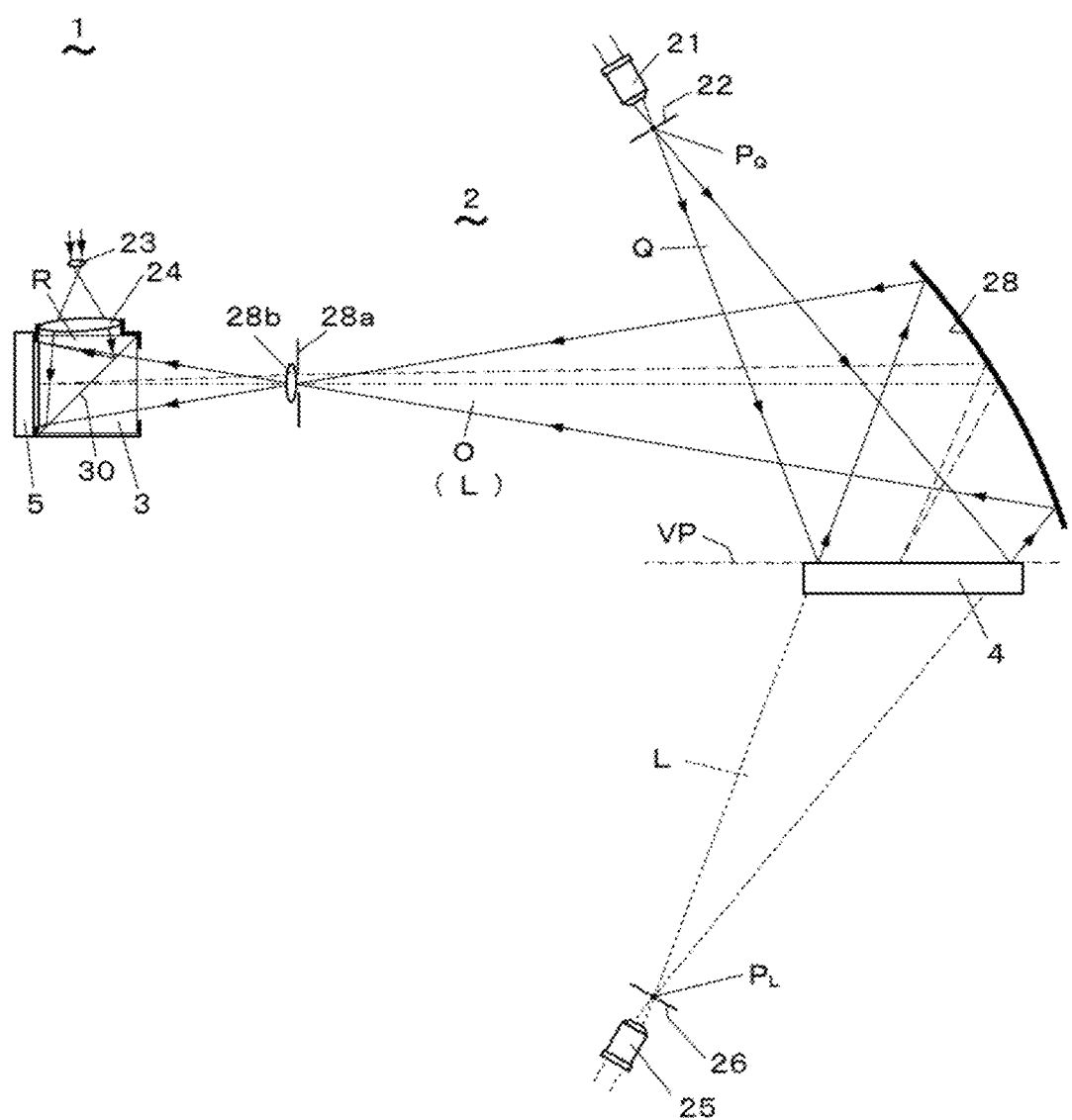
FIG. 7 is a side view showing how the object light off-axis hologram is acquired by the surface shape measuring device according to the 4th embodiment.

The surface shape measuring device 1 according to the 4th embodiment is described with reference to FIG. 7. The surface shape measuring device 1 of the present embodiment has the concave mirror 28, the pupil plate 28a, and the imaging lens 28b instead of the condenser lens 27, the pupil plate 27a, and the imaging lens 27b in the surface shape measuring device 1 of the 3rd embodiment. As the concave mirror 28, for example, a condensing elliptical mirror may be used. Also in the present surface shape measuring device 1, the concave mirror 28 and the imaging lens 28b make an image of the object light O and the inline spherical wave reference light L on the image sensor 5.

Also in the present surface shape measuring device 1, a hologram with a large diameter can be recorded by a small image sensor, and it becomes possible to observe and measure the shape of the surface to be measured without reconstructing the object light.

5TH EMBODIMENT

The surface shape measuring device 1 and the surface shape measuring method according to the 5th embodiment is described with reference to FIG. 8. The device and method of this embodiment extend the range of measurable heights, and lights of different wavelengths ($\lambda_j$, j=1, 2) are used to realize the extension. The optical system 2 of the surface shape measuring device 1 of the present embodiment has two pairs of a wavelength filter and an image sensor, wherein such a wavelength filter is inserted between the beam coupler 3 and the image sensor 5 in the optical system 2 of the 2nd embodiment (FIG. 4) described above.

That is, one set of the wavelength filter F1 passing one wavelength $\lambda_1$ and the image sensor 51 is arranged on the side opposite to the incident surface 31 of the beam coupler 3 for the object light O. Another set of the wavelength filter F2 passing another wavelength $\lambda_2$ and the image sensor 52 is arranged on the side opposite to the incident surface of the beam coupler 3 for the off-axis reference light R.

(Measurement of Surface Shape Using Phase Difference Between Light Waves with Different Wavelengths)

In the surface shape measuring method of this embodiment, following processing is performed. The data of the object light O and the inline spherical wave reference light L are acquired by the lights of different two type wavelengths $\lambda_j$, j=1, 2 as off-axis holograms $I^V_{OR}$, $I^V_{LR}$, j=1, 2 for wavelength $\lambda_1$, $\lambda_2$, respectively. Next, the measurement holograms $J^V_{j\,OS}=h^V_j/s^V_j$, j=1, 2 are generated for each wavelength $\lambda_1$, $\lambda_2$, and a heterodyne conversion for obtaining the ratio of the two generated measurement holograms $J^V_{j\,OS}$, j=1, 2 is performed. As a result of the heterodyne conversion, the modulated wave $HW=J^V_{1\,OS}/J^V_{2\,OS}$ is generated. The height distribution of the surface to be measured of the object is derived using the modulated wavelength $\lambda B=\lambda_1\lambda_2/(\lambda_2-\lambda_1)$ and the modulated phase distribution $\theta_B(x', y')=\theta_1-\theta_2$ included in the modulated wave HW.

The background and effects of the above processing is explained. For example, in the surface shape measurement using the phase of the monochromatic laser light shown in the 2nd embodiment, it is difficult to measure the height that greatly exceeds the light wavelength λ. In addition, for a step difference exceeding λ/2, an ambiguity of an integral multiple of λ/2 is involved in the measured height value. By the way, when a calculation process is performed on two light waves having different light wavelengths whose propagation directions match, a wave having a long wavelength can be generated. By using the phase of such a wave, the measurable height range can be greatly extended.

The spherical wave illumination lights Q having the wavelengths $\lambda_1$ and $\lambda_2$ emitted from the same point light source have the same propagation direction of light at all points in space, and the phase components can be expressed as $\exp(2\pi r/\lambda_1-\theta_1)$ and $\exp(2\pi r/\lambda_2-\theta_2)$, respectively. When the spherical wave illumination light Q having the light wavelength $\lambda_1$ is divided by the spherical wave illumination light Q having the light wavelength λ2, a wave having a phase component $\exp(2\pi r/\lambda_B-\theta_B)$ is generated. Here, $\lambda_B$ and $\theta_B$ are given by the following equations (22). The wavelength $\lambda_B$ matches the wavelength of the beat wave created by two illumination lights.

$$\lambda_B=(\lambda_1\lambda_2)/(\lambda_2-\lambda_k), \theta_B=\theta_1-\theta_2 \quad (22)$$

When the surface to be measured is illuminated with two spherical waves with the same light source position but different wavelengths, the propagation directions of the two reflected lights emitted from each point on the measurement surface are the same. In addition, the propagation directions of the two reflected lights, emitted from the minute surface on the measurement surface, where the interference and diffraction of the light near the surface can be ignored, also coincide. Therefore, when the reflected light of the light wavelength $\lambda_1$ is divided by the reflected light of the light wavelength $\lambda_2$, it is possible to generate a light wave of the wavelength $\lambda_B$ having a larger wavelength that functions as in the case of the illumination light Q. This means that the surface shape can be measured according to the measuring method shown in the second embodiment or the like by using the generated wave having the wavelength $\lambda_B$. If the phase difference between two waves of wavelength $\lambda_B$ is represented by $\Delta\theta_B(x', y')$, in which one wave is on the surface to be measured and the other one wave is on the virtual plane VP, the height t(x', y') of the surface to be measured is given by the following equation (23). This equation (23) is equivalent to the equation (18) for a single wavelength.

$$t(x', y') = -\frac{\Delta\theta_B(x', y')}{4\pi}\lambda_B \cos\alpha(x', y') \quad (23)$$

$$\Delta\theta_B(x', y') = \theta_{BO}(x', y') - \theta_{BL1}(x', y')$$

The above equation (23) is basically the same as the equation (18) for a single wavelength. The surface shape measuring device 1 and the surface shape measuring method according to the present embodiment can arbitrarily determine whether to use both data of the holograms acquired for two wavelengths or one of the data, at the time of post-processing. When using the data of both wavelengths, the equation (23) may be used, and when using the data of a single wavelength, the equation (18) may be used.

Figure 8:
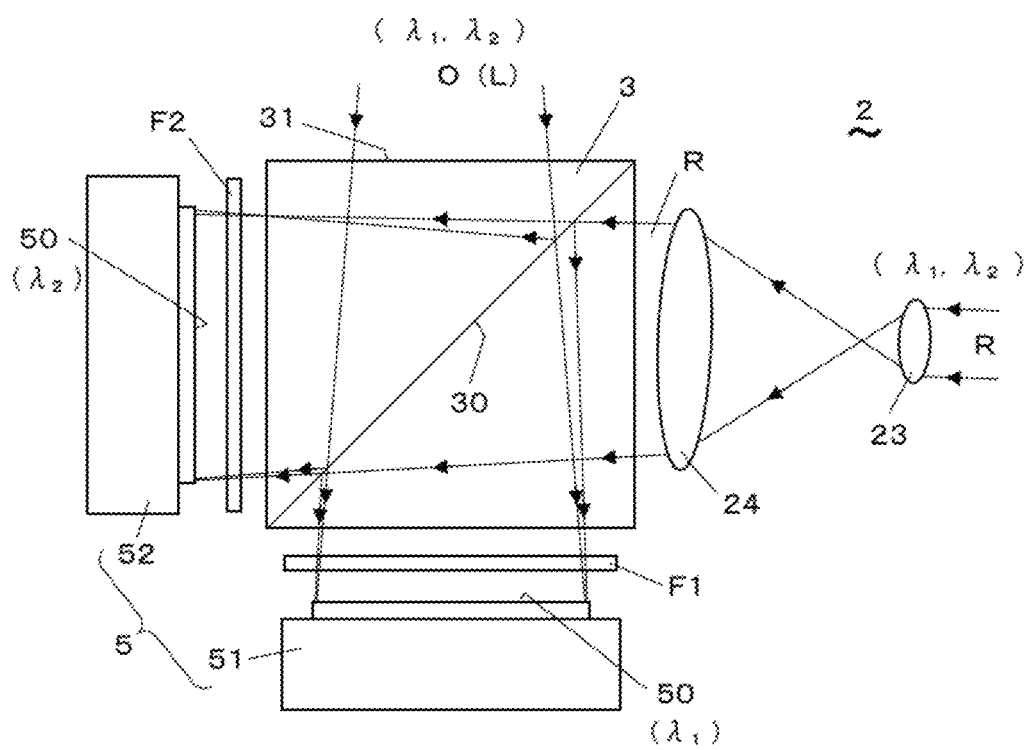
FIG. 8 is a side view around the image sensors of the surface shape measuring device according to the 5th embodiment.

Holograms with different wavelengths can be recorded in one shot by using the optical system in FIG. 8. In this case, in addition to the off-axis reference light $R_1$ for the light wavelength $\lambda_1$, the off-axis reference light $R_2$ for the light wavelength $\lambda_2$ is prepared. In this optical system, the wavelength filter F1 that transmits the light of wavelength $\lambda_1$ and blocks the light of wavelength $\lambda_2$ and the wavelength filter F2 that transmits the light of wavelength $\lambda_2$ and blocks the light of wavelength $\lambda_1$ are used in order to separate each wavelength component of the lights.

As another optical system 2 for the measuring method of this embodiment, for example, there is the optical system of FIG. 4 including only one image sensor 5 without any wavelength filter, and by using such a optical system, two types of off-axis holograms $I_{OR}$ and $I_{LR}$ may be acquired at different times for each wavelength.

As yet another optical system 2, in the optical system of FIG. 4, an optical system for the off-axis reference light R may be provided for each wavelength. In this case, by arranging the two off-axis reference lights $R_1$ and $R_2$ in an off-axis arrangement, it becomes possible to record one-shot holograms having different wavelengths. Separation into holograms for each wavelength can be performed by post-processing due to the effect of the off-axis arrangement. By performing a filtering process in the spatial frequency domain, the complex amplitude components of the optical wavelength $\lambda_1$ and $\lambda_2$ can be separated and extracted from the one-shot recorded hologram.

Note that when using two optical systems that are off-axis arranged for the off-axis reference light R, the recordable measurement surface may become narrower than when using the optical system of FIG. 8. On the contrary, in the case of the optical system of FIG. 8, the recordable measurement surface can be made large, but since the two holograms are recorded by different image sensors 51 and 52, when reconstructing the object light O, two times position adjustments are necessary for the reconstructed lights.

According to the surface shape measuring device 1 and the surface shape measuring method of the present embodiment, the combined wavelength $\lambda_B = (\lambda_1 \lambda_2)/(\lambda_2 - \lambda_1)$ becomes longer than any of the original wavelengths $\lambda_1$ and $\lambda_2$, and therefore the measurable height range can be extended. The surface shape measuring device 1 and the surface shape measuring method using lights of different wavelengths are not limited to lights of two wavelengths, and can be extended to device and method using a plurality of lights of three or more wavelengths. This method can perform the measurement, by post-processing the recorded hologram data, which is significantly different from the conventional method using the beat wave. Therefore, for example, in the case of 3 wavelengths $\lambda_1, \lambda_2, \lambda_3$, by selecting 2 wavelengths by post-processing, for example, making a plurality of combinations such as difference $(1/\lambda_1 - 1/\lambda_2)$ or using all 3 wavelengths, for example, a plurality of combinations such as the sum and the difference $(1/\lambda_1 + 1/\lambda_2 - 1/\lambda_3)$ can be created, and the measurement range can be interpolated with each other to perform the whole measurement.

6th Embodiment

Figure 9:
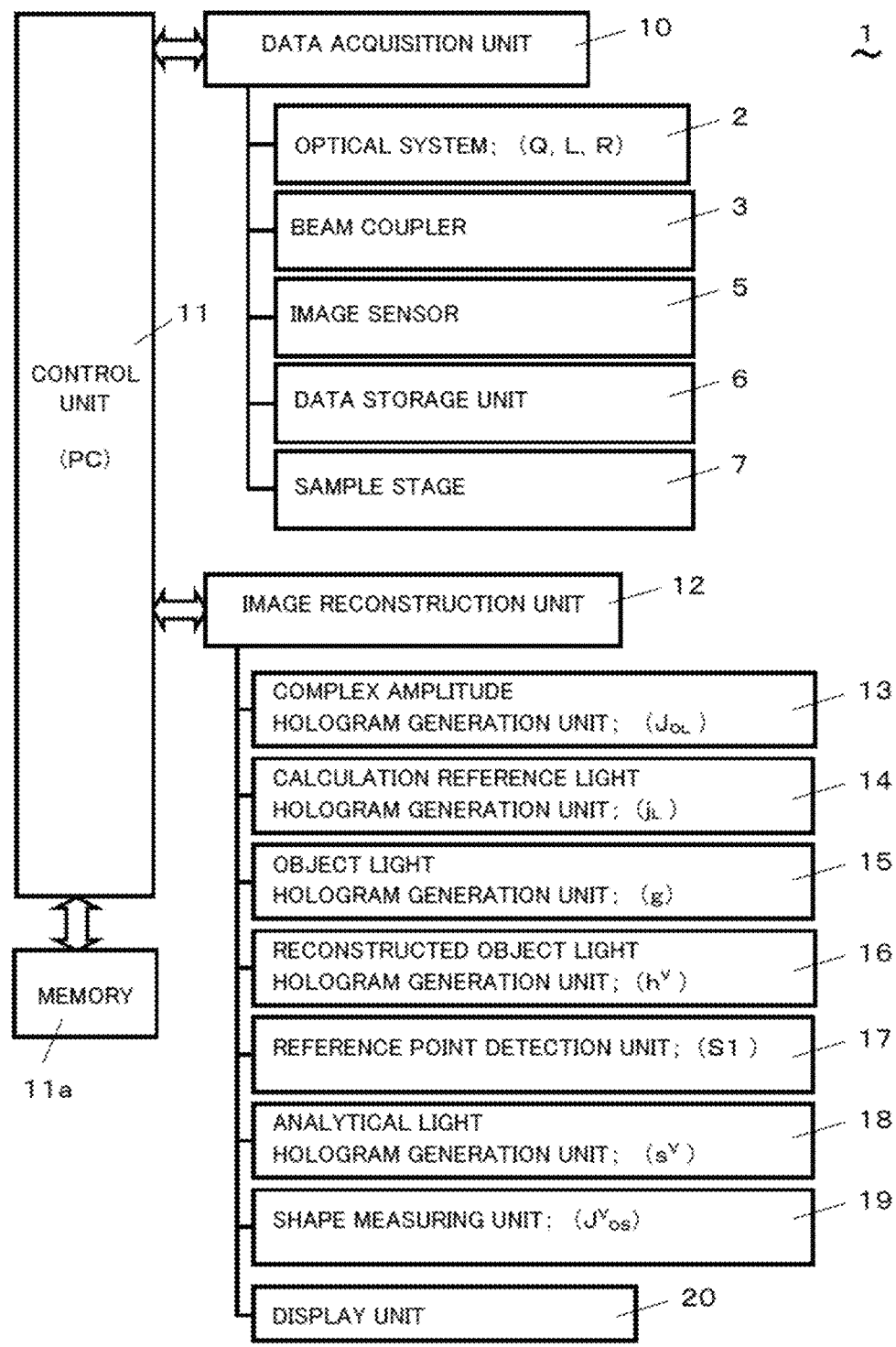
FIG. 9 is a block configuration diagram of the surface shape measuring device according to the 6th embodiment.

The surface shape measuring device 1 according to the 6th embodiment is described with reference to FIG. 9. The surface shape measuring device 1 of the present embodiment can be embodied by, for example, the surface shape measuring device 1 shown in FIG. 5 and FIG. 6, and therefore these figures are also referred to. The surface shape measuring device 1 comprises the data acquisition unit 10 that acquires holograms of the surface to be measured, and the image reconstruction unit 12 that reconstructs images on the surface to be measured from the holograms acquired by the data acquisition unit 10. The surface shape measuring device 1 further comprises the control unit 11 including a computer that controls the data acquisition unit 10 and the image reconstruction unit 12, and the memory 11a that stores calculation programs such as FFT and control data.

The data acquisition unit 10 comprises the optical system 2 that generates and propagates lights, the beam coupler 3 that is a cube-type beam splitter used as a beam coupler, the image sensor 5 that converts light intensity into electrical signals and outputs them as hologram data, and the data storage unit 6 that stores data acquired by the image sensor 5. The data storage unit 6 is provided in the control unit 11 together with the image reconstruction unit 12. The data acquisition unit 10 also comprises the sample stage 7 whose position and posture can be adjusted in relation to the arrangement of the optical system 2 and the image sensor 5.

The image reconstruction unit 12 comprises the hologram generating units 13 to 16 and 18, the reference point detecting unit 17, the shape measuring unit 19, and the display unit 20 in order to perform the processes of the respective steps shown in FIG. 1 and FIG. 3.

The complex amplitude hologram generation unit 13 removes the component of the off-axis reference light R from the object light off-axis hologram $I_{OR}$ and the reference light off-axis hologram $I_{LR}$ to generate the complex-amplitude inline hologram $J_{OL}$ for the object light O and the inline spherical wave reference light L.

The calculation reference light hologram generation unit 14 generates the inline reference light hologram $j_L$ representing the light wave of the inline spherical wave reference light L on the hologram plane 50 at the light receiving surface of the image sensor, based on that the light emitted from the reference light condensing point $P_L$ is a spherical wave.

The object light hologram generation unit 15 generates the object light hologram g representing the light wave of the object light O on the hologram plane 50 from the complex amplitude inline hologram $J_{OL}$ using the inline reference light hologram $j_L$.

The reconstructed object light hologram generation unit 16 generates the reconstructed object light hologram $h^V$ for measurement on the virtual plane VP, by converting the object light hologram g into the hologram at the position of the virtual plane VP by the light propagation calculation, and by performing the rotational transformation on the converted hologram by the virtual plane tilt angle $\alpha_O$ being the tilt angle of the virtual plane VP with respect to the hologram plane 50.

The reference point detection unit 17 performs the light propagation calculation of the object light hologram g, detects the condensing point of the object light by the correlation function calculation, and sets the point as the reference point S1 for shape measurement.

The analytical light hologram generation unit 18 analytically generates the spherical wave light hologram $s^V$ which is a hologram on the virtual plane VP of the spherical wave corresponding to the inline spherical wave reference light L emitted from the reference light condensing point $P_L$.

The shape measuring unit 19 divides the reconstructed object light hologram $h^V$ by the spherical wave light hologram $s^V$ to generate the measurement hologram $J^V_{OS}$ relating to the object light O and the spherical wave light hologram $s^V$, and calculates the height distribution of the surface to be measured of the object 4 from the phase distribution of the complex amplitude inline hologram $J^V_{OS}$ for measurement.

The display unit 20 displays images obtained by the image sensor 5, intensity images of each hologram, phase distribution images, and the like. The data of the object light off-axis hologram $I_{OR}$ and the reference light off-axis hologram $I_{LR}$ stored in the data storage unit 6 are processed by the image reconstruction unit 12 and displayed on the display unit 20. The display unit 20 is an FPD such as a liquid crystal display device, displays data other than images too, and serves as a user interface. Except for the display unit 20, each unit of the image reconstruction unit 12 is configured by using programs running on a computer and software including a group of their subroutines.

Example 1

The flatness measurement of the example 1 is described with reference to FIG. 10, FIG. 11, and FIG. 12. Using a plane mirror of a float glass substrate having a flatness specification of 4λ to 5λ as a sample for flatness measurement, a complex amplitude inline hologram for shape measurement was obtained using the optical system shown in FIG. 4 and FIG. 5. A green semiconductor pumped solid-state laser (wavelength 532 nm, output 50 mW) was used as a light source, and a monochrome camera link CCD camera (number of pixels 6600×4400, pixel pitch 5.5 μm) was used as an image sensor. Each of the spherical wave lights used for the inline spherical wave reference light and the spherical wave illumination light was generated using an objective lens with a numerical aperture NA=0.1 and a pinhole with an aperture diameter of 3 μm. The pinhole was placed at a position 567 mm away from the image sensor surface, and a surface to be measured was placed at a position 13.9 mm away. The numerical aperture of the recorded hologram (pixel number 4096×4096) is NA=0.02.

Figure 10:
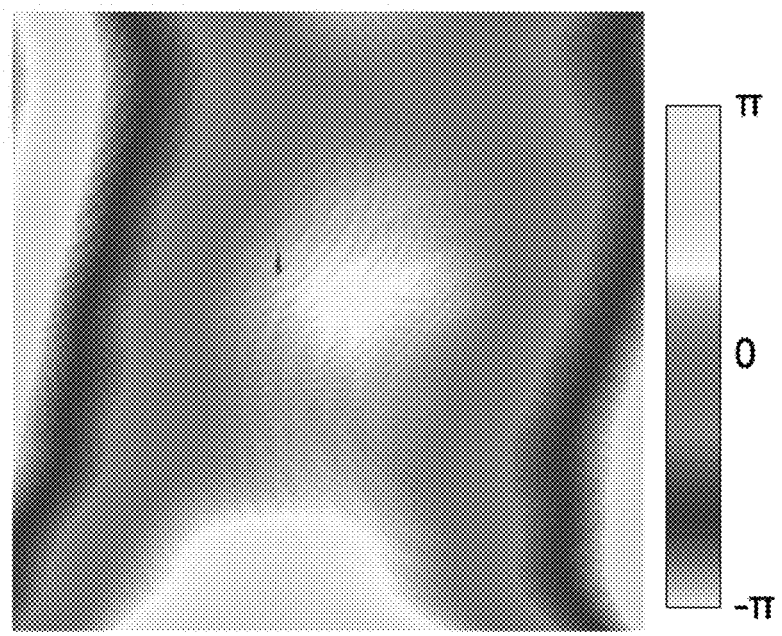
FIG. 10 is an image showing a phase distribution of the complex amplitude hologram on a surface of a plane mirror sample, which is obtained using the surface shape measuring device according to the present invention (example 1).

FIG. 10 shows the phase distribution of the complex amplitude inline hologram on the mirror surface of the plane mirror having the flatness specifications of 4λ to 5λ.

Figure 11:
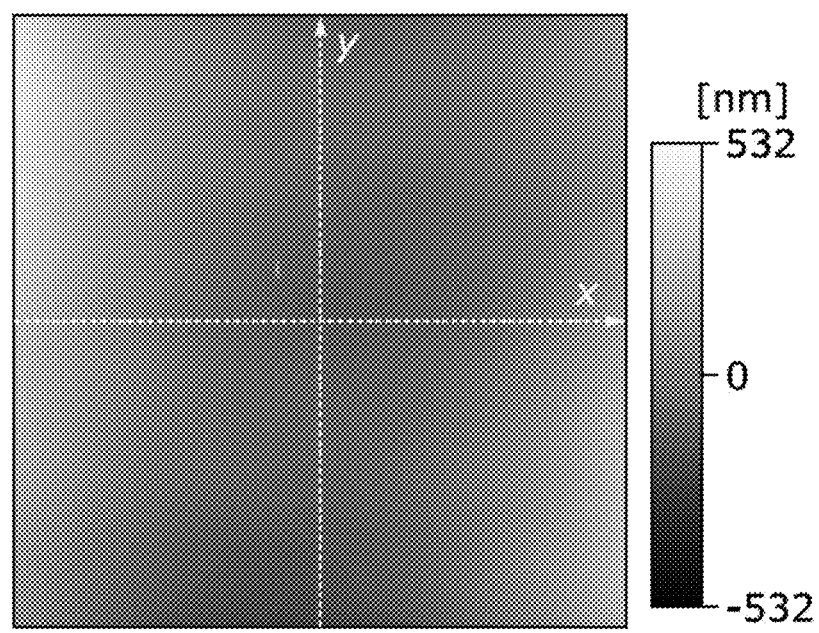
FIG. 11 is an image showing a surface height distribution obtained using the phase distribution of FIG. 10.
Figure 12A:
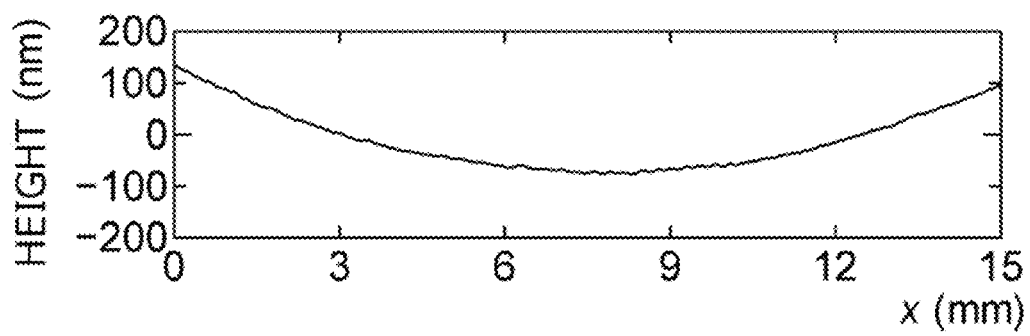
FIG. 12A is a diagram of a height distribution on a straight line in the x direction in FIG. 11.
Figure 12B:
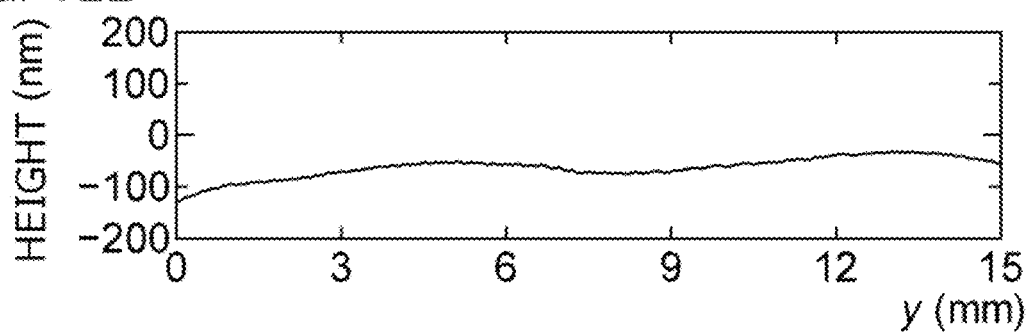
FIG. 12B is a diagram of a height distribution on a straight line in they direction in FIG. 11.

FIG. 11 shows the two-dimensional distribution of the surface heights obtained by using the phase distribution of FIG. 10. The difference PV=431.7 nm between the maximum value and the minimum value of the surface height and the standard deviation RMS=69.0 nm of the height were obtained in the measurement area 15 mm×15 mm. In the measurement area, the PV value is smaller than A and satisfies the flatness specifications 4λ to 5λ. FIG. 12A and FIG. 12B show the height distributions on the straight lines in the x-axis and y-axis directions shown in FIG. 11, respectively. As the radius of curvature in the x-axis direction shown in FIG. 12A, about 160 m was obtained.

Example 2

The flatness measurement of the example 2 is described with reference to FIG. 13, FIG. 14A and FIG. 14B. The complex amplitude inline hologram for shape measurement was obtained for a plane mirror having a flatness specification of λ/4 as a sample for flatness measurement, using the device used in the example 1.

Figure 13:
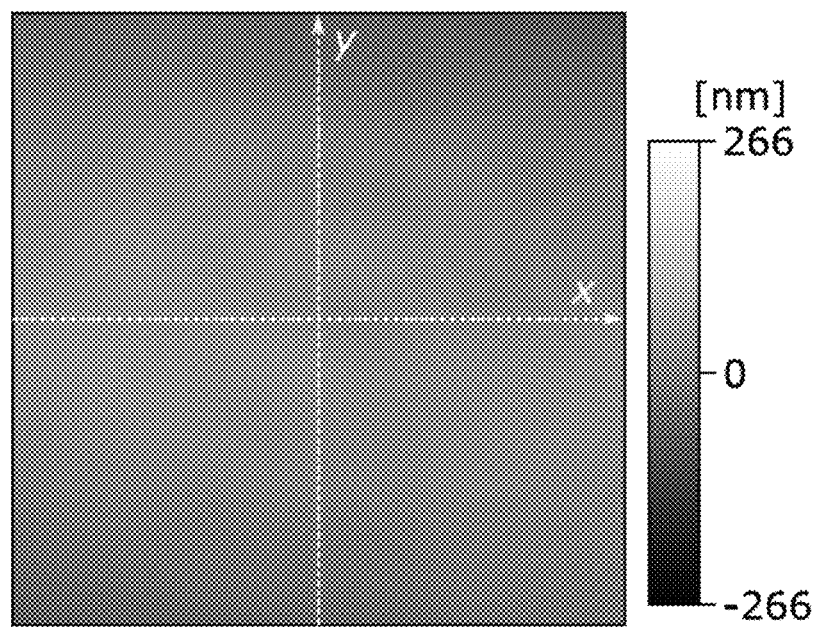
FIG. 13 is an image showing a surface height distribution obtained for another flat mirror sample (example 2).
Figure 14A:
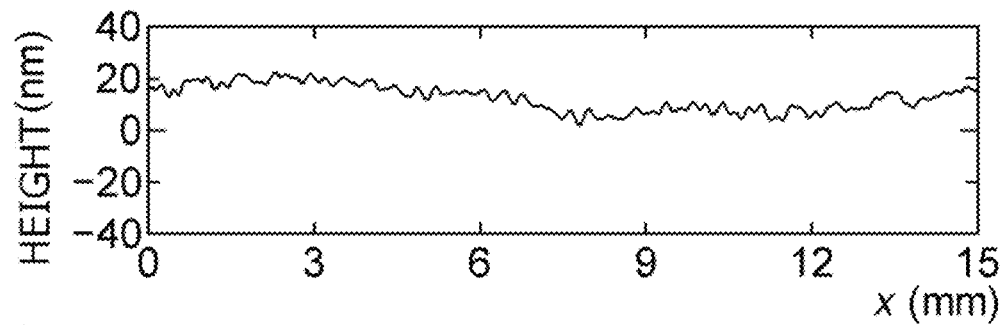
FIG. 14A is a diagram of a height distribution on a straight line in the x direction in FIG. 13.
Figure 14B:
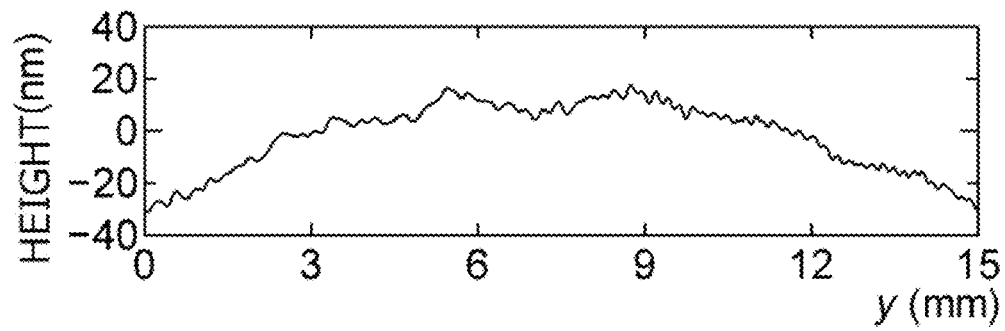
FIG. 14B is a diagram of a height distribution on a straight line in they direction in FIG. 13.

FIG. 13 shows the two-dimensional distribution of the surface height of the plane mirror having the flatness specification λ/4. The difference PV=81.3 nm between the maximum value and the minimum value of the surface height and the standard deviation RMS=15.3 nm of the height were obtained. In the measurement area, the PV value is smaller than λ/4 and satisfies the flatness specification λ/4. FIG. 14A and FIG. 14B show the height distributions on the straight lines in the x-axis and y-axis directions shown in FIG. 13. As the radius of curvature in the y-axis direction shown in FIG. 14B, about 750 m was obtained. The resolution of the surface shape measurement is determined by the bandwidth of the spatial frequency filtering performed on the reconstructed object light. The resolution of the image in the examples 2, 3(SIC) is about 78 μm.

Example 3

The flatness measurement of the example 3 is described with reference to FIG. 15, FIG. 16A and FIG. 16B. The complex-amplitude inline hologram for shape measurement was obtained for a precision optical flat mirror having a flatness specification of λ/20 as a sample for flatness measurement, using the device used in the example 1.

Figure 15:
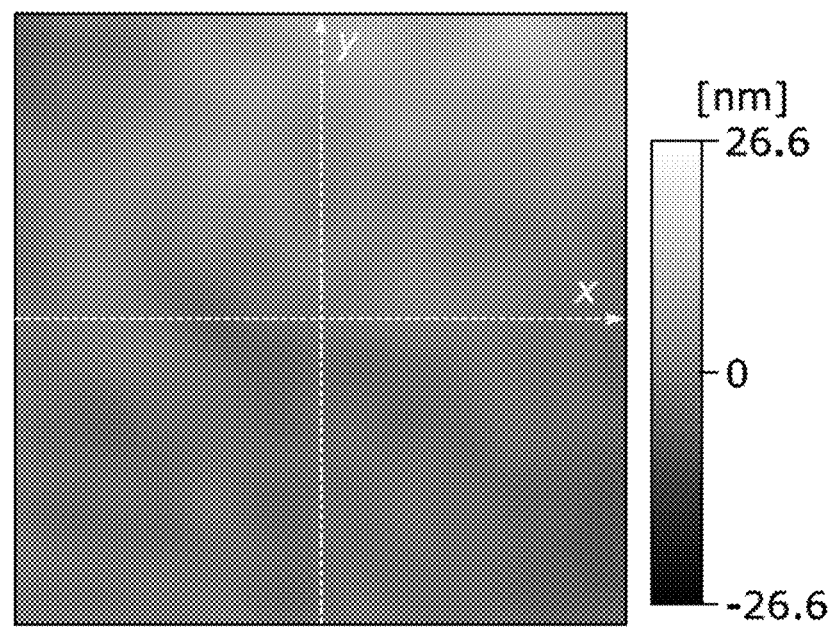
FIG. 15 is an image showing a surface height distribution obtained for another plane mirror sample (example 3).

FIG. 15 shows the two-dimensional distribution of the surface height of the plane mirror having the flatness specification λ/4(SIC). The difference PV=19.6 nm between the maximum value and the minimum value of the surface height and the standard deviation RMS=2.5 nm of the height were obtained. In the measurement area, the PV value is smaller than λ/20 and satisfies the flatness specification λ/20.

Figure 16A:
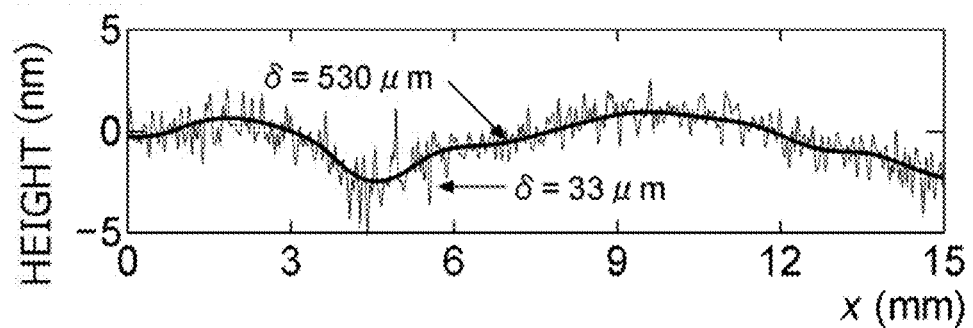
FIG. 16A is a diagram of a height distribution on a straight line in the x direction in FIG. 15.
Figure 16B:
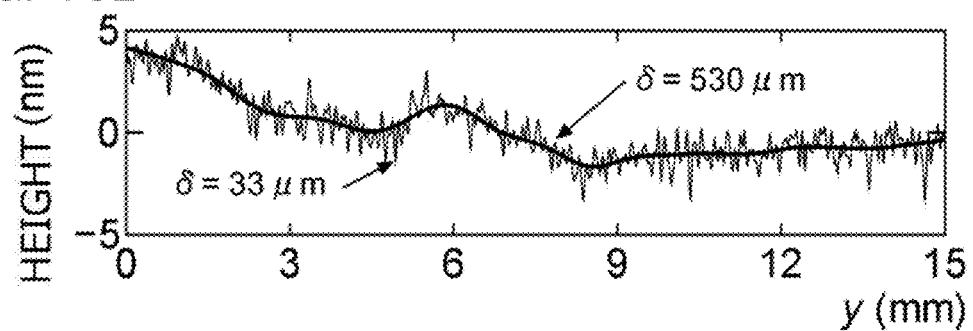
FIG. 16B is a diagram of a height distribution on a straight line in they direction in FIG. 15.

FIG. 16A and FIG. 16B show the height distributions on the straight lines in the x-axis and y-axis directions shown in FIG. 15, respectively.

The recorded object light contains weak multiple reflected lights generated on the surface of the cube-type beam splitter (beam coupler) and on the surface of the cover glass fixed on the front of the image sensor. By slightly inclining the surfaces of the beam splitter and the cover glass from the image sensor surface, the propagation direction of these multiple reflected lights and the propagation direction of the reflected light from the surface to be measured can be shifted. In this example, by utilizing this fact, the influence of the multiple reflected lights is removed from the recording hologram by performing spatial filtering in the real space.

The resolution of surface shape measurement is determined by the bandwidth of spatial frequency filtering performed on the reconstructed object light. The measurement result of FIG. 16A shows the height distributions obtained with two kinds of resolutions, high resolution δ=33 μm and low resolution δ=530 μm. The measurement result of FIG. 16B is also the same.

In addition to scattered lights due to the surface roughness of the surface to be measured, scattered lights generated on the surface of the cube-type beam splitter and the cover glass of the image sensor, and noise generated by the image sensor could be involved in the high-frequency component of the height distribution. It is believed that in order to achieve high accuracy in surface shape measurement and surface roughness measurement, it is necessary to remove scattered light generated on the beam splitter surface and the cover glass surface.

Example 4

The flatness measurement of the example 4 is described with reference to FIG. 17, FIG. 18A and FIG. 18B. Using the negative pattern USAF test target as a sample for surface shape measurement and using the device used in the example 1, the complex amplitude inline hologram for shape measurement was obtained.

Figure 17:
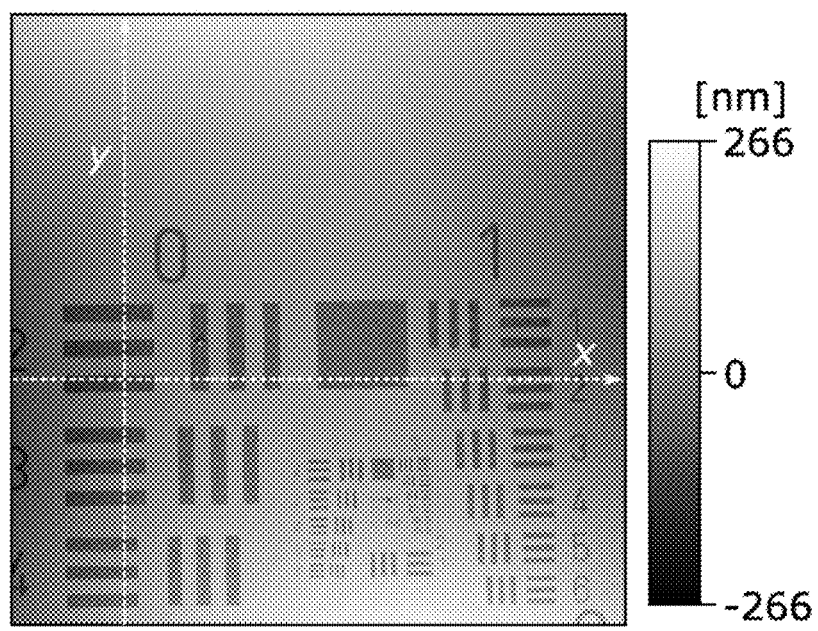
FIG. 17 is an image showing a surface height distribution obtained for a negative pattern USAF test target (example 4).

FIG. 17 shows the two-dimensional distribution of heights on the target surface. The measurement area is 15 mm×15 mm, and the high part represents the chromium surface and the low part represents the surface of the glass substrate. The resolution of surface shape measurement is determined by the bandwidth of spatial frequency filtering performed on the reconstructed object light. The resolution of the image shown in FIG. 17 is about 24 μm.

Figure 18A:
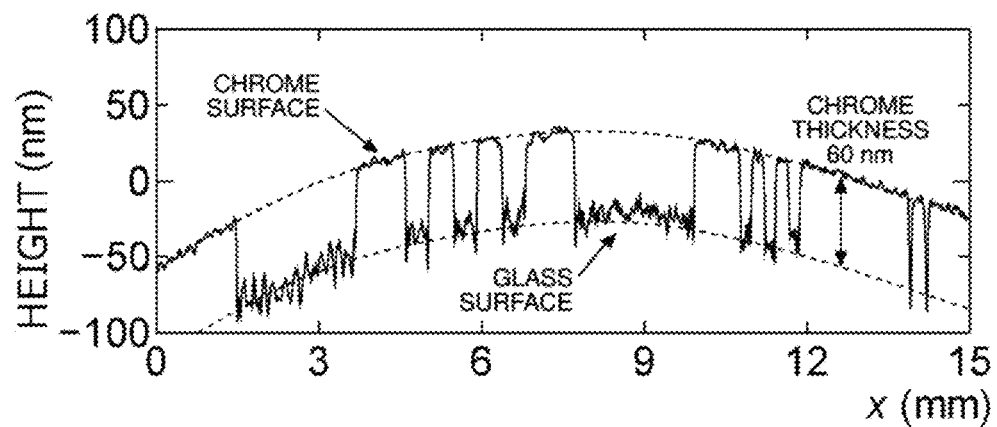
FIG. 18A is a diagram of a height distribution on a straight line in the x direction in FIG. 17.
Figure 18B:
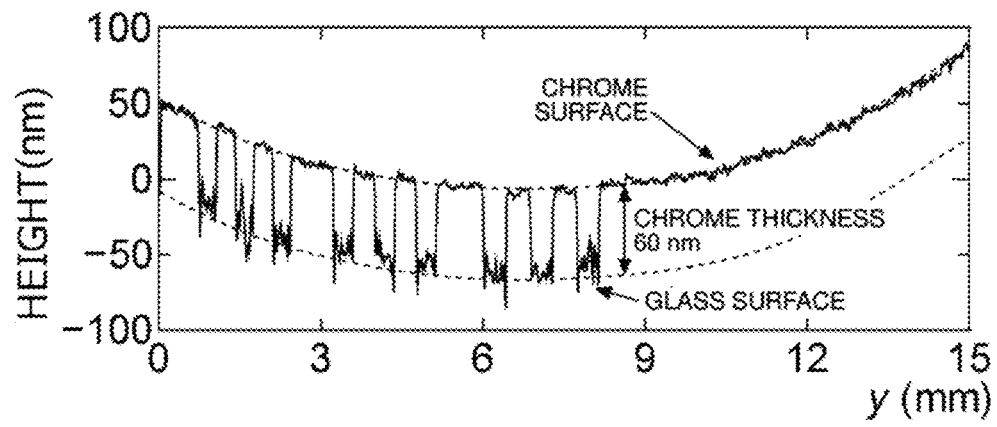
FIG. 18B is a diagram of a height distribution on a straight line in they direction in FIG. 17.

FIG. 18A and FIG. 18B show the height distributions on the straight lines in the x-axis and y-axis directions shown in FIG. 17, respectively. The glass surface and the chrome surface can be clearly distinguished. The chrome thickness is constant over the entire measuring area, and its value is about 60 nm. Further, the results of FIG. 17 to FIG. 18B show that the glass substrate is curved in a gentle saddle shape. About 500 m is obtained as the radius of curvature in each of the x-axis and y-axis directions.

Example 5

The flatness measurement of the example 4 is described with reference to FIG. 19 to FIG. 23. In this example 5, the surface shape measurement was performed on a color filter for a liquid crystal display using the surface shape measuring device 1 according to the 5th embodiment. The surface shape measuring device 1 is a device capable of one-shot recording and measurement with single-wavelength light and two-wavelength light. The color filter to be measured has a structure in which an RGB filter is attached to a black matrix, and columnar photo spacers having a height of about 4 μm and a diameter of about 6 μm are arranged in an equally spaced staggered manner on the color filter.

In the present example, two types of measurement were performed, that is, measurement with two-wavelength laser lights having wavelengths $\lambda$=756 nm and 786 nm for measuring the height of the columnar photo-spacer, and measurement with a single wavelength He—Ne laser light having a wavelength $\lambda$=632.8 nm for measuring the height of the lower portion.

Figure 19:
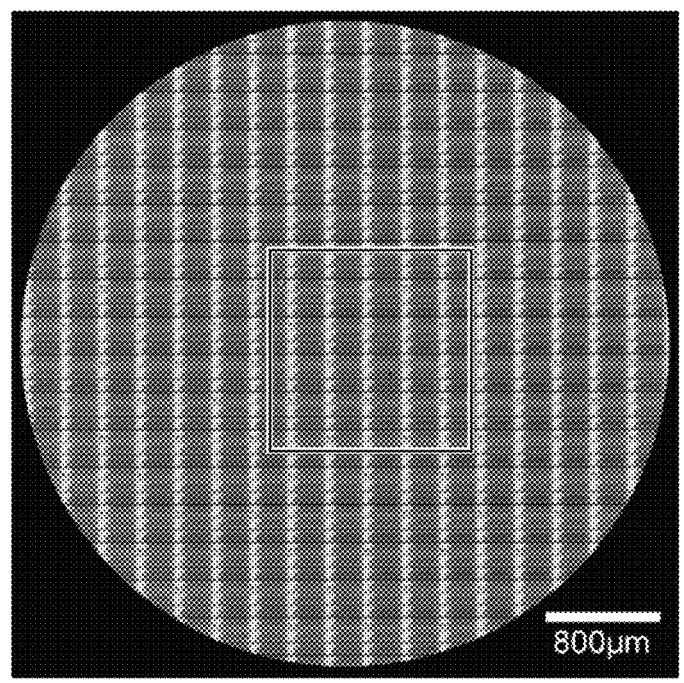
FIG. 19 is an image showing a height distribution of a liquid crystal display filter measured using the surface shape measuring device according to the present invention (example 5).
Figure 20:
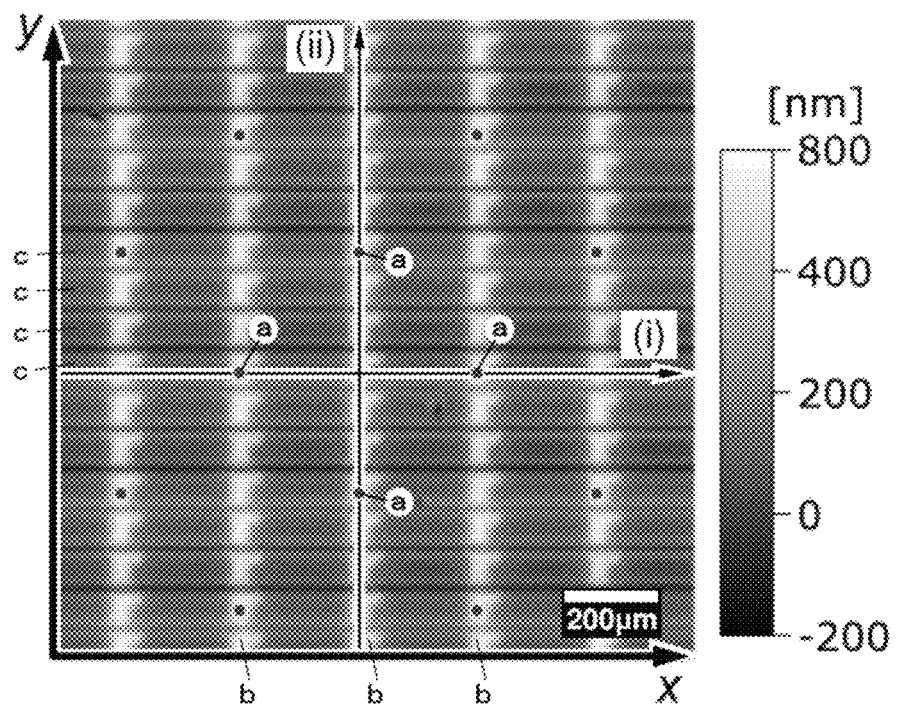
FIG. 20 is an enlarged image of the part within the square in FIG. 19.

FIG. 19 shows the measurement result of the height distribution of the color filter in the area of 4 mm in diameter, and FIG. 20 shows an enlarged view of the square portion in FIG. 19. In these images, the portion where the height of the color filter being low is black and the portion where the color filter being high is white, but the columnar photo spacer a is shown by a black dot for easy viewing. As shown in these images, the image without distortion can be obtained, and the fine structure of the color filter and the height distribution of each part can be clearly identified. In addition, the measurement results show that the flatness of the filter is maintained with extremely high accuracy.

Figure 21:
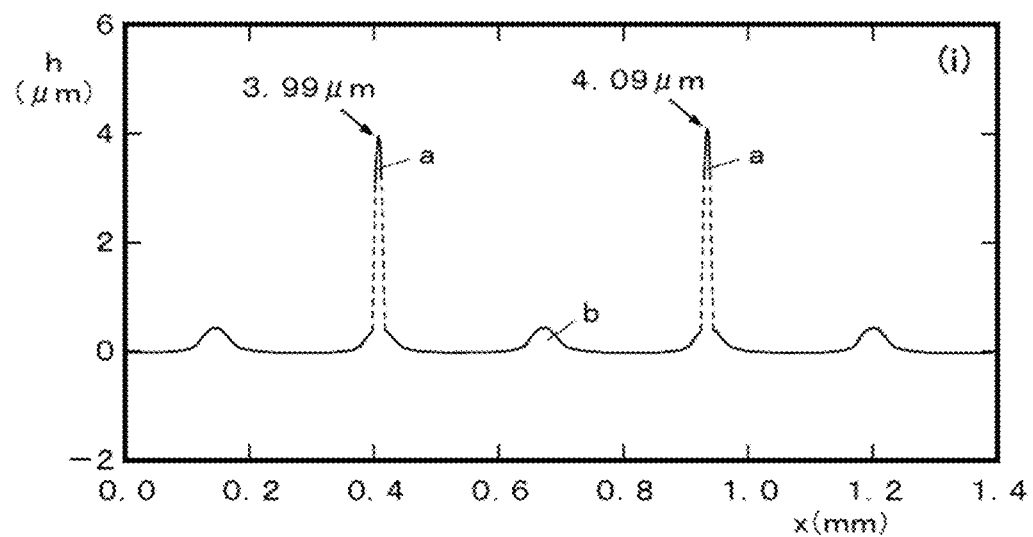
FIG. 21 is a height distribution diagram showing a measurement result along the measurement line (i) in the image of FIG. 20.
Figure 22:
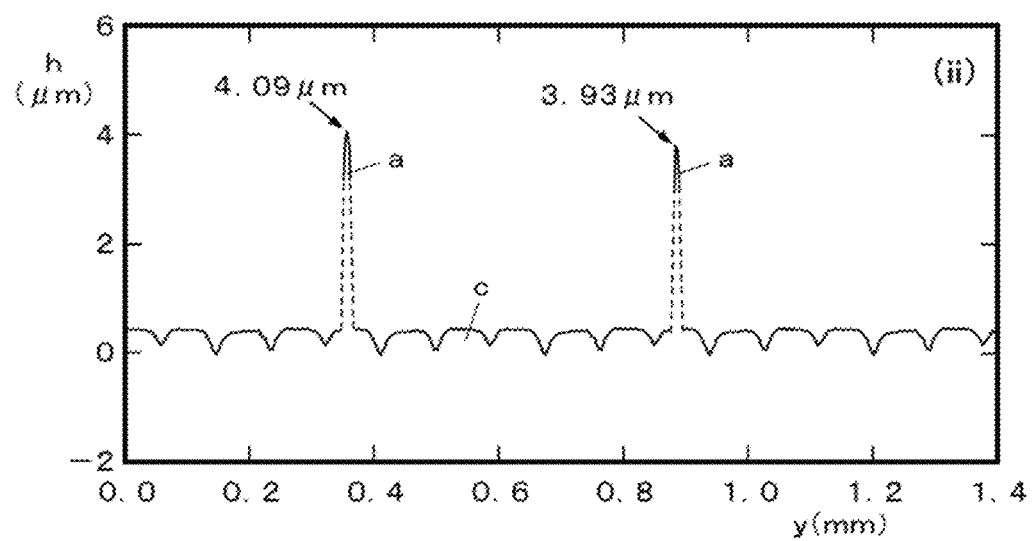
FIG. 22 is a height distribution diagram showing a measurement result along the measurement line (ii) in the image of FIG. 20.

FIG. 21 shows the measurement result along the straight line (i) in the x-axis direction in FIG. 20, and FIG. 22 shows the measurement result along the straight line (ii) in the y-axis direction in FIG. 20. On each of the straight lines (i) and (ii), two columnar photo spacers a are included.

In FIG. 21 and FIG. 22, the filter portions b and c (low peaks with short cycle) are the results of measurement using laser light having a wavelength $\Delta$=632.8 nm, and the photo spacer a (high peaks with long cycle) is the result of measurement using laser light having wavelengths of $\Delta$=756 nm and 786 nm. The beat wavelength $\lambda_B$ created by the latter two laser beams is $\lambda_B$=19.8 μm, which enables the measurement of the columnar photo-spacer a having a height of about 4 μm. A broken line extending downward from the peak of the photo spacer a indicates a portion where the light intensity of the reconstructed light is too small to measure accurately. This indicates that the reflected light from the side of the photo spacer did not reach the image sensor (CCD).

Figure 23:
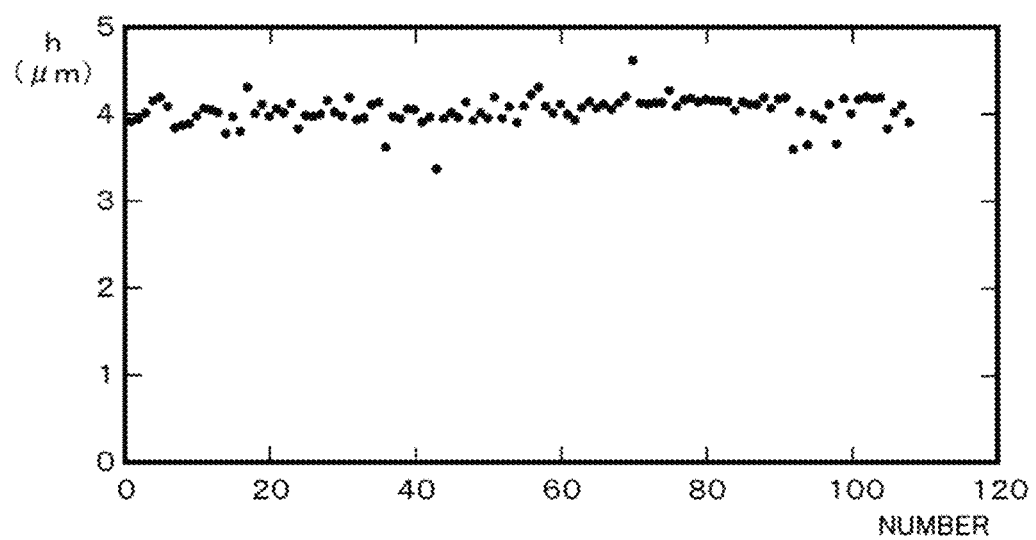
FIG. 23 is a diagram of a spacer height measurement value distribution obtained for the measurement target in FIG. 19.

FIG. 23 shows the measurement results side by side with numbers assigned to the photo spacers in the recorded area. From this measurement result, it can be seen that a uniform photo spacer having a height of 4 μm is formed with high accuracy, and useful measurement can be performed. From the results of this example, it is understood that the surface shape measuring device 1 and the method according to the 5th embodiment can perform highly accurate height distribution measurement over a wide range from nm to several tens of μm. Further, in the present embodiment, the object light is recorded by one-shot and the measurement result is obtained by the post-processing in the computer, and it can be seen that high-speed and highly accurate shape measurement can be realized.

Note that the present invention is not limited to the above configuration, and various modifications can be made. For example, the configurations of the above-described embodiments may be combined with each other.

INDUSTRIAL APPLICABILITY

The novelty and superiority of the present invention over the prior art include: (1) one-shot recording of light waves enables high-speed measurement; (2) high-accuracy absolute flatness measurement of the surface to be measured is possible; (3) since no reference plane or collimating lens is used, the diameter of the flatness measurement area can be increased; (4) the flatness measurement can be performed on the surface to be measured having a wide range of reflection coefficient; (5) the reflected light on the surface to be measured is reconstructed on the surface to be measured, and the reconstructed light can be used to measure the surface shape and surface roughness with high resolution; (6) adjustment mechanism for movement and rotation is unnecessary, and the configuration of the recording optical system is very simple.

Due to the above advantages, the present invention can be applied to a wide range of applications that make use of these advantages in the fields of optics, digital holography, optical measurement, interferometry, and fine shape measurement. Further, from the viewpoint of technological application, it can be considered to be used in fields such as precision measurement, nanotechnology, substrate shape measurement, semiconductor substrate inspection, and optical component inspection. Specific examples of use include surface shape measurement of thin glass substrates, photomasks, large wafers, etc., surface shape measurement of optical parts, measurement of industrial reference planes, and the like.

EXPLANATIONS OF LETTERS OR NUMERALS

1 Surface shape measuring device
10 Data acquisition unit
12 Image reconstruction unit
13 Complex amplitude hologram generation unit
14 Calculation reference light hologram generation unit
15 Object light hologram generation unit
16 Reconstructed object optical hologram generation unit
17 Reference point detection unit
18 Analytical light hologram generation unit
19 Shape measuring unit
2 Optical system
27 Condenser lens
27*a* Pupil plate
27*b* Imaging lens
28 Concave mirror
28*a* Pupil plate
28*b* Imaging lens
3 Beam coupler (cube-type beam splitter)

4 Object
5 Image sensor
50 Hologram plane
6 Data storage unit
7 Sample stage
C Correlation function
HW Modulated wave
$I_{LR}$, $I^V_{LR}$ Reference light off-axis hologram
$I_{OR}$, $I^V_{OR}$ Object light off-axis hologram
$J_{OL}$ Complex-amplitude inline hologram of object light
$J^V_{OS}$, $J^V_{j\,OS}$ Measurement hologram (complex amplitude inline hologram for measurement)
L Inline spherical wave reference light
Object light
$P_L$ Condensing point of in-line spherical wave reference light
$P_O$ Base point
$P_R$ Condensing point of off-axis reference light
Q Illumination light
R Off-axis reference light
S1 Reference point for shape measurement (reference point light source)
VP Virtual plane
fp Virtual point light source (probe function)
g Object light hologram
h0 Evaluation hologram
$h^V$ Reconstructed object light hologram
$j_L$ Inline reference light hologram
$s^V$ Spherical wave light hologram
$\alpha_O$ Tilt angle
$\rho$ Distance from the image sensor to the condensing point of inline spherical wave reference light
$\lambda_B$ Modulated wavelength
$\lambda_j$, $\lambda_1$, $\lambda_2$ Wavelength
$\theta_B$ Modulated phase

The invention claimed is:

1. A surface shape measuring device using holography, comprising:
a data acquisition unit for acquiring data of an object light (O) that is a reflected light of a spherical wave illumination light (Q) illuminating a surface to be measured and data of an inline spherical wave reference light (L) that is inline with respect to the object light (O), respectively, as an object light off-axis hologram ($I_{OR}$) and a reference light off-axis hologram ($I_{LR}$), using an image sensor; and
an image reconstruction unit for deriving data of surface shape by reconstructing an image of the surface to be measured from the data acquired by the data acquisition unit, wherein
the data acquisition unit comprises:
an optical system which is configured to make both an illumination light condensing point ($P_O$) being a condensing point of the spherical wave illumination light (Q) and a reference light condensing point ($P_L$) being a condensing point of the inline spherical wave reference light (L) be arranged in a mirror image of each other with respect to a virtual plane (VP) being virtually set so as to contact the surface to be measured, and configured to make the inline spherical wave reference light (L) obliquely pass through the virtual plane (VP) and enter the image sensor, and
the image reconstruction unit comprises:
an object light hologram generation unit for generating an object light hologram (g) representing the light wave of the object light (O) by a calculation process using the data of the two kinds of off-axis holograms ($I_{OR}$, $I_{LR}$), position information of the reference light condensing point ($P_L$), and the fact that the light emitted from the reference light condensing point ($P_L$) is a spherical wave;
a reconstructed object light hologram generation unit for generating a reconstructed object light hologram ($h^V$) on the virtual plane (VP) by performing a light wave propagation calculation and a rotational transformation on the object light hologram (g);
a reference point detection unit for detecting, by performing a light wave propagation calculation on the object light hologram (g), a position at which the object light (O) is condensing, and for setting the position as a reference point (S1), to be used for shape measurement, having more precise information than the position information of the reference light condensing point ($P_L$);
an analytical light hologram generation unit for analytically generating a spherical wave light hologram ($s^V$) that is a hologram, on the virtual plane (VP), of a spherical wave light emitted from the reference point (S1); and
a shape measuring unit for generating a measurement hologram ($J^V os = h^V / s^V$) by dividing the reconstructed object light hologram ($h^V$) by the spherical wave light hologram ($s^V$), and for obtaining a height distribution of the surface to be measured of the object using a phase distribution of the measurement hologram ($J^V os$).

2. The surface shape measuring device according to claim 1, wherein
the data acquisition unit comprises a beam coupler, consisting of a cube-type beam splitter and arranged immediately in front of the image sensor, for coupling the off-axis reference light (R), used for acquiring the two kinds of off-axis holograms ($I_{OR}$, $I_{LR}$), and the object light (O) or the inline spherical wave reference light (L) so as to make the coupled lights enter the image sensor,
the image reconstruction unit generates, through a calculation process, an inline reference light hologram ($j_L$) which represents a light wave corresponding to the inline spherical wave reference light (L) reaching a hologram plane being a light-receiving surface of the image sensor after emitted from the reference light condensing point ($P_L$) and passing through the beam coupler, by performing a light wave propagation calculation on a light passing through the beam coupler by a plane wave expansion method in consideration of a refractive index of the beam coupler.

3. The surface shape measuring device according to claim 2, wherein
the optical system comprises: a condenser lens for condensing the object light (O) and the inline spherical wave reference light (L); a pupil plate being disposed at a condensing position made by the condenser lens to limit amount of passing light; and an imaging lens arranged in combination with the pupil plate, so that each image of the object light (O) and the inline spherical wave reference light (L) is made on the image sensor.

4. The surface shape measuring device according to claim 2, wherein
the optical system comprises: a concave mirror for condensing the object light (O) and the inline spherical wave reference light (L); a pupil plate being disposed at a condensing position made by the concave mirror to limit amount of passing light; and an imaging lens arranged in combination with the pupil plate, so that each image of the object light (O) and the inline spherical wave reference light (L) is made on the image sensor.

5. The surface shape measuring device according to claim 1, wherein
the optical system comprises: a condenser lens for condensing the object light (O) and the inline spherical wave reference light (L); a pupil plate being disposed at a condensing position made by the condenser lens to limit amount of passing light; and an imaging lens arranged in combination with the pupil plate, so that each image of the object light (O) and the inline spherical wave reference light (L) is made on the image sensor.

6. The surface shape measuring device according to claim 1, wherein
the optical system comprises: a concave mirror for condensing the object light (O) and the inline spherical wave reference light (L); a pupil plate being disposed at a condensing position made by the concave mirror to limit amount of passing light; and an imaging lens arranged in combination with the pupil plate, so that each image of the object light (O) and the inline spherical wave reference light (L) is made on the image sensor.

7. A surface shape measuring method using holography, comprising the steps of:
arranging a reference light condensing point ($P_L$) being a condensing point of an inline spherical wave reference light (L) on an optical axis of an image sensor, arranging an illumination light condensing point ($P_Q$) being a condensing point of a spherical wave illumination light (Q) off the optical axis, and setting a virtual plane (VP) being a plane that bisects a line segment connecting the reference light condensing point ($P_L$) and the illumination light condensing point ($P_Q$) vertically;
arranging an object so that a surface to be measured is in contact with the virtual plane (VP), and acquiring data of an object light (O) being a reflected light of the spherical wave illumination light (Q) reflected from the surface to be measured as an object light off-axis hologram ($I_{OR}$) using the image sensor;
acquiring, in a state where the object is not arranged, data of the inline spherical wave reference light (L) passing through the virtual plane (VP) and being incident on the image sensor as a reference light off-axis hologram ($I_{LR}$) using the image sensor;
generating a complex amplitude inline hologram ($J_{OL}$) containing information on both the object light (O) and the inline spherical wave reference light (L) from the data of the two kinds of off-axis holograms ($I_{OR}$, $I_{LR}$);
generating an inline reference light hologram ($j_L$) representing a light wave of the inline spherical wave reference light (L) on a hologram plane being a light-receiving surface of the image sensor by performing a calculation process using the fact that the inline spherical wave reference light (L) is a spherical wave light;
generating an object light hologram (g) representing a light wave of the object light (O) using the complex amplitude inline hologram ($J_{OL}$) and the inline reference light hologram ($j_L$);
generating a reconstructed object light hologram ($h^V$) on the virtual plane (VP) by performing a light wave propagation calculation and a rotational transformation on the object light hologram (g);
detecting, by performing a light wave propagation calculation on the object light hologram (g), a position at which the object light (O) is condensing, and setting the position as a reference point (S1), to be used for shape measurement, having more precise information than the position information of the reference light condensing point ($P_L$);
generating a spherical wave light hologram ($s^V$) being a hologram on the virtual plane (VP) of a spherical wave light emitted from the reference point (S1); and
generating a measurement hologram ($J^V os = h^V/s^V$) by dividing the reconstructed object light hologram ($h^V$) by the spherical wave light hologram ($s^V$), and obtaining a height distribution of the surface to be measured of the object using a phase distribution of the measurement hologram ($J^V os$).

8. The surface shape measuring method according to claim 7, further comprising the steps of:
acquiring, by using lights of different wavelengths ($\lambda_j$, j=1, 2), the data of the object light (O) and the inline spherical wave reference light (L) as the two kinds of off-axis holograms ($I^j_{OR}$, $I^j_{LR}$, j=1, 2) for each of the wavelengths ($\lambda_1$, $\lambda_2$);
generating the measurement hologram ($J_j^V os = h_j^V/s_j^V$, j=1, 2) for each of the wavelengths ($\lambda_1$, $\lambda_2$);
generating a modulated wave (HW = $J_1^V os/J_2^V os$) being a result of a heterodyne conversion for obtaining a ratio of the two measurement holograms ($J_j^V os$, j=1, 2);
obtaining a height distribution of the surface to be measured of the object using a modulated wavelength ($\lambda_B = \lambda_1\lambda_2/(\lambda_2-\lambda_1)$) and a modulated phase distribution ($\theta_B(x', y') = \theta_1 - \theta_2$) which are included in the modulated wave (HW).

9. The surface shape measuring method according to claim 8, wherein
a sample stage is used to arrange the object so that the surface to be measured contacts the virtual plane (VP), adjustment of the sample stage comprises the steps of:
fixing a reference plane substrate having a reference plane on the sample stage, and acquiring data of a reflected light from the reference plane substrate as the object light off-axis hologram ($I_{OR}$);
generating the complex amplitude inline hologram ($J_{OL}$) using the object light off-axis hologram ($I_{OR}$) and the reference light off-axis hologram ($I_{LR}$); and
changing position and tilt of the sample stage so that changes in a phase distribution of the complex amplitude inline hologram ($J_{OL}$) is reduced.

10. The surface shape measuring method according to claim 9, further comprising the steps of:
generating an evaluation hologram (h0) made by propagating the object light hologram (g) to a position (z=ρ) of the reference light condensing point ($P_L$) by performing a light wave propagation calculation;
detecting a position (x1, y1, ρ), where the object light (O) is condensed, in a plane of the evaluation hologram (h0) and setting the position (x1, y1, ρ) to be a temporary condensing point (P1), by calculating a correlation function between a probe function (fp) representing a point light source and the evaluation hologram (h0);
propagating the evaluation hologram (h0) tentatively in a direction of the optical axis by a light wave propagation calculation, performing the correlation function calculation while fixing the position of the temporary condensing point (P1) in the plane of the evaluation hologram (h0), detecting a position (x1, y1, z1) in the direction of the optical axis where the object light (O)

is condensing, and setting the detected position to be the reference point (S1) for the shape measurement.

11. The surface shape measuring method according to claim 8, further comprising the steps of:

generating an evaluation hologram (h0) made by propagating the object light hologram (g) to a position (z=ρ) of the reference light condensing point ($P_L$) by performing a light wave propagation calculation;

detecting a position (x1, y1, ρ), where the object light (O) is condensed, in a plane of the evaluation hologram (h0) and setting the position (x1, y1, ρ) to be a temporary condensing point (P1), by calculating a correlation function between a probe function (fp) representing a point light source and the evaluation hologram (h0);

propagating the evaluation hologram (h0) tentatively in a direction of the optical axis by a light wave propagation calculation, performing the correlation function calculation while fixing the position of the temporary condensing point (P1) in the plane of the evaluation hologram (h0), detecting a position (x1, y1, z1) in the direction of the optical axis where the object light (O) is condensing, and setting the detected position to be the reference point (S1) for the shape measurement.

12. The surface shape measuring method according to claim 7, wherein a sample stage is used to arrange the object so that the surface to be measured contacts the virtual plane (VP), adjustment of the sample stage comprises the steps of:

fixing a reference plane substrate having a reference plane on the sample stage, and acquiring data of a reflected light from the reference plane substrate as the object light off-axis hologram ($I_{OR}$);

generating the complex amplitude inline hologram ($J_{OL}$) using the object light off-axis hologram ($I_{OR}$) and the reference light off-axis hologram ($I_{LR}$); and changing position and tilt of the sample stage so that changes in a phase distribution of the complex amplitude inline hologram ($J_{OL}$) is reduced.

13. The surface shape measuring method according to claim 12, further comprising the steps of:

generating an evaluation hologram (h0) made by propagating the object light hologram (g) to a position (z=ρ) of the reference light condensing point ($P_L$) by performing a light wave propagation calculation;

detecting a position (x1, y1, ρ), where the object light (O) is condensed, in a plane of the evaluation hologram (h0) and setting the position (x1, y1, ρ) to be a temporary condensing point (P1), by calculating a correlation function between a probe function (fp) representing a point light source and the evaluation hologram (h0);

propagating the evaluation hologram (h0) tentatively in a direction of the optical axis by a light wave propagation calculation, performing the correlation function calculation while fixing the position of the temporary condensing point (P1) in the plane of the evaluation hologram (h0), detecting a position (x1, y1, z1) in the direction of the optical axis where the object light (O) is condensing, and setting the detected position to be the reference point (S1) for the shape measurement.

14. The surface shape measuring method according to claim 7, further comprising the steps of:

generating an evaluation hologram (h0) made by propagating the object light hologram (g) to a position (z=ρ) of the reference light condensing point ($P_L$) by performing a light wave propagation calculation;

detecting a position (x1, y1, ρ), where the object light (O) is condensed, in a plane of the evaluation hologram (h0) and setting the position (x1, y1, ρ) to be a temporary condensing point (P1), by calculating a correlation function between a probe function (fp) representing a point light source and the evaluation hologram (h0);

propagating the evaluation hologram (h0) tentatively in a direction of the optical axis by a light wave propagation calculation, performing the correlation function calculation while fixing the position of the temporary condensing point (P1) in the plane of the evaluation hologram (h0), detecting a position (x1, y1, z1) in the direction of the optical axis where the object light (O) is condensing, and setting the detected position to be the reference point (S1) for the shape measurement.

* * * * *